(12) United States Patent
Dabbadi et al.

(10) Patent No.: US 12,132,928 B2
(45) Date of Patent: Oct. 29, 2024

(54) BLOCK-LEVEL COLLOCATED MOTION FIELD PROJECTION FOR VIDEO CODING

(71) Applicant: QUALCOMM Incorporated, San Diego, CA (US)

(72) Inventors: Gopi Madhan Dabbadi, Bangalore (IN); Yasutomo Matsuba, San Diego, CA (US); Sandeep Nellikatte Srivatsa, Bangalore (IN); Ashish Mishra, Bhubaneswar (IN)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 17/929,548

(22) Filed: Sep. 2, 2022

(65) Prior Publication Data
US 2024/0080474 A1 Mar. 7, 2024

(51) Int. Cl.
*H04N 19/513* (2014.01)
*H04N 19/433* (2014.01)
*H04N 19/55* (2014.01)
*H04N 19/573* (2014.01)

(52) U.S. Cl.
CPC ......... *H04N 19/521* (2014.11); *H04N 19/433* (2014.11); *H04N 19/55* (2014.11); *H04N 19/573* (2014.11)

(58) Field of Classification Search
CPC .... H04N 19/521; H04N 19/433; H04N 19/55; H04N 19/573
See application file for complete search history.

(56) References Cited

U.S. PATENT DOCUMENTS

| 2014/0037011 | A1* | 2/2014 | Lim | H04N 19/513 |
| | | | | 375/240.16 |
| 2016/0134890 | A1* | 5/2016 | Tourapis | H04N 19/142 |
| | | | | 375/240.15 |
| 2018/0310017 | A1* | 10/2018 | Chen | H04N 19/52 |

(Continued)

OTHER PUBLICATIONS

Abeydeera M., et al., "4K Real-Time HEVC Decoder on an FPGA", IEEE Transactions on Circuits and Systems for Video Technology, IEEE, USA, vol. 26, No. 1, Jan. 1, 2016, pp. 236-249, XP011592170, Mailny sections III.C-III.D, p. 238, Para III-p. 242, Figures 7-10.

(Continued)

*Primary Examiner* — Shawn S An
(74) *Attorney, Agent, or Firm* — QUALCOMM Incorporated; Espartaco Diaz Hidalgo

(57) ABSTRACT

Systems and techniques are provided for processing video data. For example, an apparatus may obtain one or more first sets of collocated motion vector data and one or more second sets of collocated motion vector data, associated with a respective first and second block of video data included in a current frame of video data. The apparatus may project the one or more first sets of collocated motion vector data into a first projected motion field associated with a first buffer and project the one or more second sets of collocated motion vector data into the first projected motion field associated with the first buffer. Based on projecting the one or more first sets and one or more second sets of collocated motion vector data, the apparatus may decode the first block of video data based on the first projected motion field associated with the first buffer.

30 Claims, 18 Drawing Sheets

(56) References Cited

U.S. PATENT DOCUMENTS

2020/0045319 A1    2/2020  Xu et al.
2021/0360245 A1*  11/2021  Xu ..................... H04N 19/119

OTHER PUBLICATIONS

International Search Report and Written Opinion—PCT/US2023/069791—ISA/EPO—Oct. 20, 2023.
Moschetti F., "A Statistical Approach to Motion Estimation", These Presentee a La Section D'electricite Ecole Polytechniquefederale De Lausanne Pour Obtention Du Grade De Docteur Esssciences Techniques, XX, XX, Jan. 31, 2001, 154 Pages, XP002346537, p. 113, Para 5.10-p. 122, Para 5.11.2.

* cited by examiner

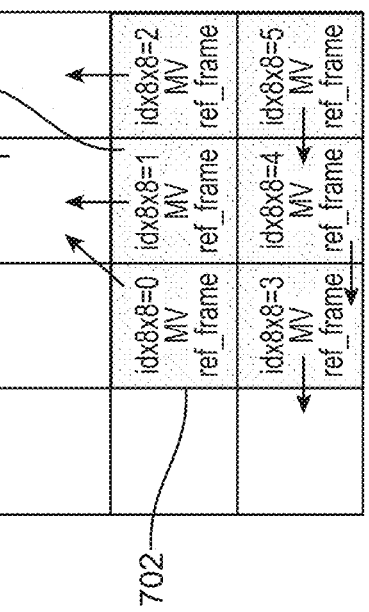
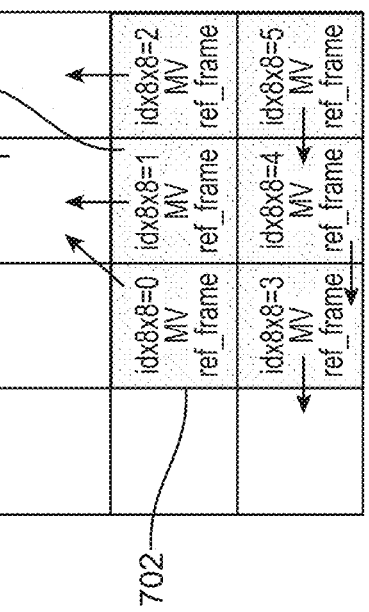
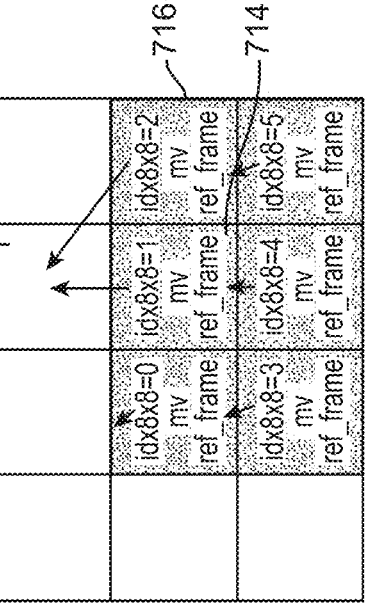
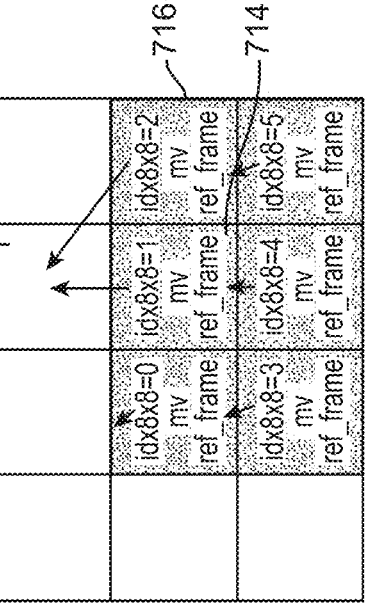
FIG. 7A
FIG. 7B
FIG. 7C
FIG. 7D

BLOCK-LEVEL COLLOCATED MOTION FIELD PROJECTION FOR VIDEO CODING

FIELD

The present disclosure generally relates to video encoding and decoding. For example, aspects of the present disclosure include improving video coding techniques related to collocated motion field projection.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding techniques with better coding efficiency are needed.

BRIEF SUMMARY

In some examples, systems and techniques are described for block-level collocated motion field projection. For example, the systems and techniques can read and project motion vectors associated with one or more collocated reference frames into block-level motion fields. The one or more collocated reference frames can be associated with a current (e.g., currently decoded) frame of video data. Each respective block-level motion field can be associated with a block included in the current frame of video data. The block-level motion field and the block included in the current frame of video data may have a same relative location with respect to the collocated reference frame(s) and the current block of video data, respectively. The projected block-level motion fields can be stored in one or more buffers. The motion field associated with a current block of video data can be used to decode the current block of video data concurrent to determining the motion field for one or more subsequent blocks of video data.

According to at least one illustrative example, an apparatus for processing video data is provided that includes at least one memory (e.g., configured to store data, such as virtual content data, one or more images, etc.) and at least one processor (e.g., implemented in circuitry) coupled to the at least one memory. The at least one processor is configured to and can: obtain one or more first sets of collocated motion vector data associated with a first block of video data included in a current frame of video data; project each set of the one or more first sets of collocated motion vector data into a first projected motion field associated with a first buffer; obtain one or more second sets of collocated motion vector data associated with a second block of video data included in the current frame of video data; project each set of the one or more second sets of collocated motion vector data into the first projected motion field associated with the first buffer; and based on projecting each set of the one or more first sets of collocated motion vector data and projecting each set of the one or more second sets of collocated motion vector data into the first projected motion field associated with the first buffer, decode the first block of video data based on the first projected motion field associated with the first buffer.

In another example, a method for processing video data is provided, the method including: obtaining one or more first sets of collocated motion vector data associated with a first block of video data included in a current frame of video data; projecting each set of the one or more first sets of collocated motion vector data into a first projected motion field associated with a first buffer; obtaining one or more second sets of collocated motion vector data associated with a second block of video data included in the current frame of video data; projecting each set of the one or more second sets of collocated motion vector data into the first projected motion field associated with the first buffer; and based on projecting each set of the one or more first sets of collocated motion vector data and projecting each set of the one or more second sets of collocated motion vector data into the first projected motion field associated with the first buffer, decoding the first block of video data based on the first projected motion field associated with the first buffer.

In another example, a non-transitory computer-readable medium is provided that has stored thereon instructions that, when executed by one or more processors, cause the one or more processors to: obtain one or more first sets of collocated motion vector data associated with a first block of video data included in a current frame of video data; project each set of the one or more first sets of collocated motion vector data into a first projected motion field associated with a first buffer; obtain one or more second sets of collocated motion vector data associated with a second block of video data included in the current frame of video data; project each set of the one or more second sets of collocated motion vector data into the first projected motion field associated with the first buffer; and based on projecting each set of the one or more first sets of collocated motion vector data and projecting each set of the one or more second sets of collocated motion vector data into the first projected motion field associated with the first buffer, decode the first block of video data based on the first projected motion field associated with the first buffer.

In another example, an apparatus for processing video data is provided, the apparatus including: means for obtaining one or more first sets of collocated motion vector data associated with a first block of video data included in a current frame of video data; means for projecting each set of the one or more first sets of collocated motion vector data into a first projected motion field associated with a first buffer; means for obtaining one or more second sets of collocated motion vector data associated with a second block of video data included in the current frame of video data; means for projecting each set of the one or more second sets of collocated motion vector data into the first projected motion field associated with the first buffer; and based on projecting each set of the one or more first sets of collocated motion vector data and projecting each set of the one or more second sets of collocated motion vector data into the first projected motion field associated with the first buffer, means for decoding the first block of video data based on the first projected motion field associated with the first buffer.

In some aspects, one or more of the apparatuses described herein is, is part of, and/or includes a mobile device or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a camera, a personal computer, a laptop computer, a vehicle or a computing device or component of a vehicle, a server computer or server device, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIGS. 7A-D illustrate an example of collocated motion vector projection and overwriting of an existing motion vector field projection, in accordance with some examples of the disclosure;

DETAILED DESCRIPTION

Figure 1:
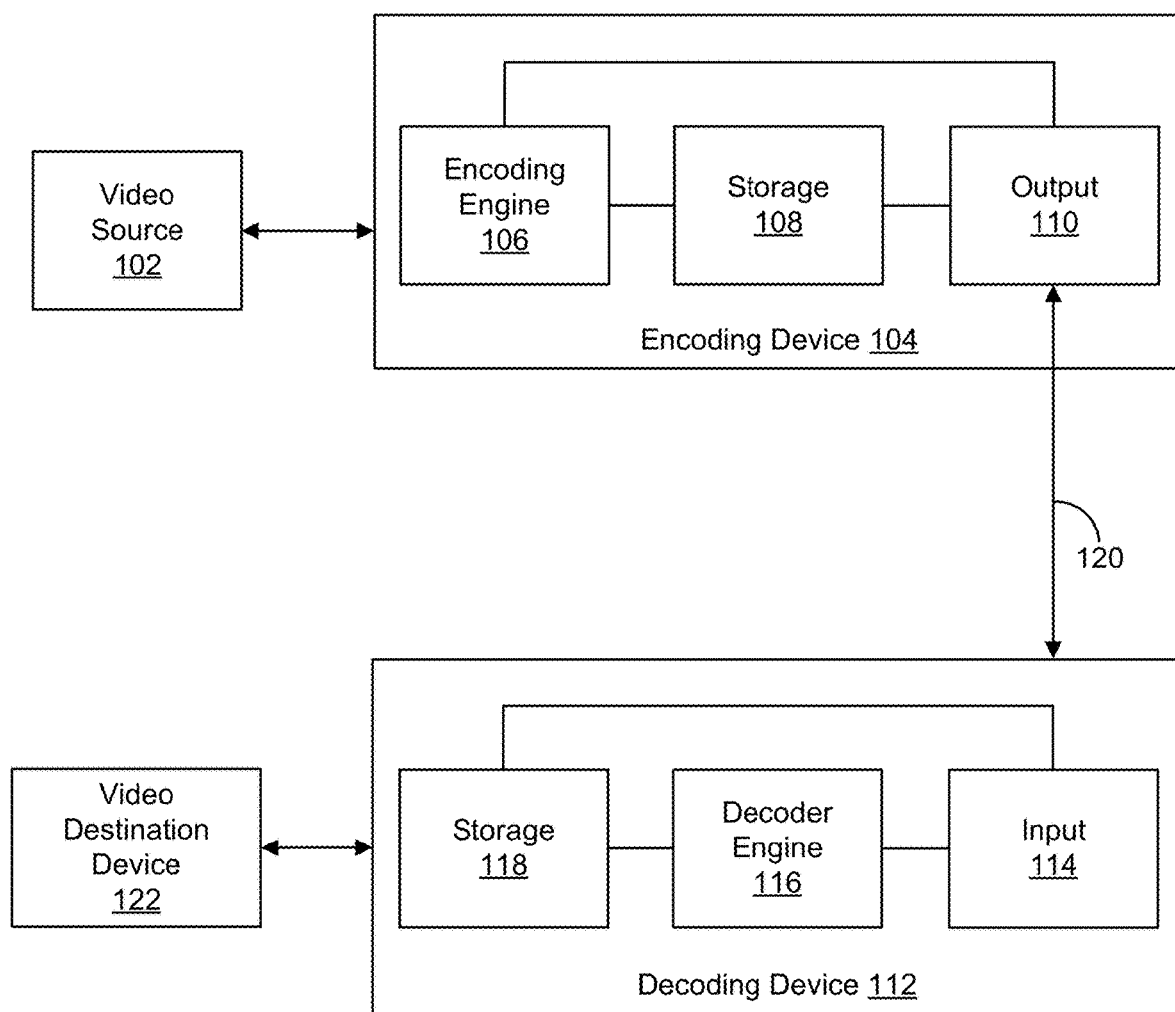
FIG. 1 is a block diagram illustrating an example of an encoding device and a decoding device, in accordance with some examples of the disclosure.

Certain aspects and aspects of this disclosure are provided below. Some of these aspects and aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides exemplary aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

Video coding devices (e.g., encoding devices, decoding devices, or combined encoding-decoding devices) implement video compression techniques to code (e.g., encode and/or decode) video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

In some cases, collocated motion vector projection can be performed based on projecting some (or all) of a set of temporal motion vectors determined for a start frame with respect to a current frame and its reference frame. In some cases, temporal motion vectors determined for a given frame with index x can be used to generate one or motion vector projections that may be located within the given frame x and/or may be located outside of the given frame x. In some examples, a motion vector projection may be invalidated (e.g., rejected or not selected) if the location of the motion vector projection is not included within one of: the given frame from which the motion vector projection originated, the horizontally adjacent frame to the left of the given frame, and the horizontally adjacent frame to the right of the given frame. In some examples, collocated motion vector projection can be performed for up to three collocated reference frames, referred to as REF0, REF1, and REF2. The motion vectors associated with REF0 can be projected first, and may be overwritten by later projected motion vectors associated with REF1 and/or REF2, based on having the same projection end location.

In some examples, collocated motion vector projection may be performed using a frame-level raster scan order. For instance, for a given frame of video data, all of the REF0 motion vectors may be projected in the raster scan order of the frame, followed by all of the REF1 motion vectors and the REF2 motion vectors (e.g., projected sequentially, and each in raster scan order of the frame). Performing collocated motion vector projection by processing three collocated reference frames in a frame-level raster scan order may be associated with four read operations and four write operations of collocated data. For example, the four read operations may include three read operations to read the REF0, REF1, and REF2 motion vector data (e.g., prior to performing the respective motion vector projection for each reference frame), and a fourth read operation to read the final contents of a projected motion vector buffer. The four write operations can include three write operations to write the REF0, REF1, and REF2 motion vector projections to the projected motion vector buffer, and a fourth write operation to write a final motion vector prediction for the current frame to memory (e.g., based on the combined motion vector projection field stored in the projected motion vector buffer).

There is a need to reduce the quantity of clock cycles used to perform collocated motion vector projection for one or more (e.g., up to three) collocated reference frames. There is a need to reduce the read/write bandwidth associated with using collocated motion vector projection to decode frames of video data. There is a further need to reduce the size (e.g., storage capacity) of one or more buffers associated with storing projected motion vectors determined when performing collocated motion vector projection.

Systems, apparatuses, processes (also referred to as methods), and computer-readable media (collectively referred to herein as "systems and techniques") are described herein for performing collocated motion vector projection using block-level processing. In some aspects, the described herein can be used to perform on-the-fly (e.g., real-time or near-real-time) collocated motion vector projection based on a block-based processing order. In some examples, the systems and techniques can be used to read and project reference frame motion vectors at the based on a block level scan. In some aspects, a currently decoded frame of video data may be associated with three collocated reference frames (e.g., REF0, REF1, REF2). The associated motion vector data included in the three collocated reference frames can be read and projected at a 64×64 block level. For example, the currently decoded frame of video data may be divided into a plurality of 64×64 sized blocks, and motion vectors can be obtained from the three collocated reference frames (e.g., REF0, REF1, REF2) using the same 64×64 block size. In some cases, the associated motion vector data included in the collocated reference frames can be read and projected at a 128×128 block level. In some examples, the systems and techniques can avoid writing projected motion vectors to DDR or other memory based using the block-based processing order described herein for performing collocated motion vector projection.

In some aspects, the systems and techniques can include one or more MV projection buffers implemented in hardware, wherein the one or more MV projection buffers are sized to be three times larger than the block-level size (e.g., for a 64×64 block level, the one or more MV projection buffers can be sized to store three 64×64 blocks; for a 128×128 block level, the one or more MV projection buffers can be sized to store three 128×128 blocks).

In some examples, a given block of video data can be decoded in parallel with collocated motion vector projection operations performed for one or more additional and/or subsequent blocks of the video data. For example, the additional and/or subsequent blocks of the video data can be horizontally adjacent to the right of the currently decoded block of video data (e.g., with both blocks included in the same frame of video data). In some cases, a given block of video data can be decoded based on determining that MV projection has been completed for the given block, with the decoding performed independently from the MV projection operations for subsequent blocks of video data.

The techniques described herein can be implemented using one or more coding devices, including one or more encoding devices, decoding devices, or combined encoding-decoding devices. The coding devices can be implemented by one or more of a player device, such as a mobile device, extended reality (XR) device, a vehicle or computing system of a vehicle, a server device or system (e.g., a distributed server system including multiple servers, a single server device or system, etc.), or other device or system.

The systems and techniques described herein can be applied to any existing video codecs, any video codecs that are in development, and/or any future video coding standards, including but not limited to High Efficiency Video Coding (HEVC), Advanced Video Coding (AVC), Versatile Video Coding (VVC), VP9, the AOMedia Video 1 (AV1) format/codec, and/or other video coding standard in existence, in development, or to be developed. The systems and techniques described herein can improve the operation of communication systems and devices in a system by improving the performance of video data transfer by devices with improved compression and associated improved video quality based on improved motion vector selection from adaptive bilateral matching as described herein.

Various aspects of the systems and techniques will be described with respect to the figures.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enable parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction can be indexed. In other examples, more intra modes may be defined including prediction angles that may not already be represented by the 33 angular modes. In other examples, the prediction angles associated with the angular modes may be different from those used in HEVC.

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame.

Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some aspects, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some aspects following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a decoded picture buffer (DPB) for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some aspects, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList0 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

As noted above, in HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU. When the CU is inter-coded, one set of motion information is present for each PU. In addition, each PU is coded with a unique inter-prediction mode to derive the set of motion information.

For motion prediction in HEVC for example, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, one or more scaling window offsets can be included along with stored motion vectors in a MV candidate list.

In examples where a MV candidate list is used for motion prediction of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g., information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2A:
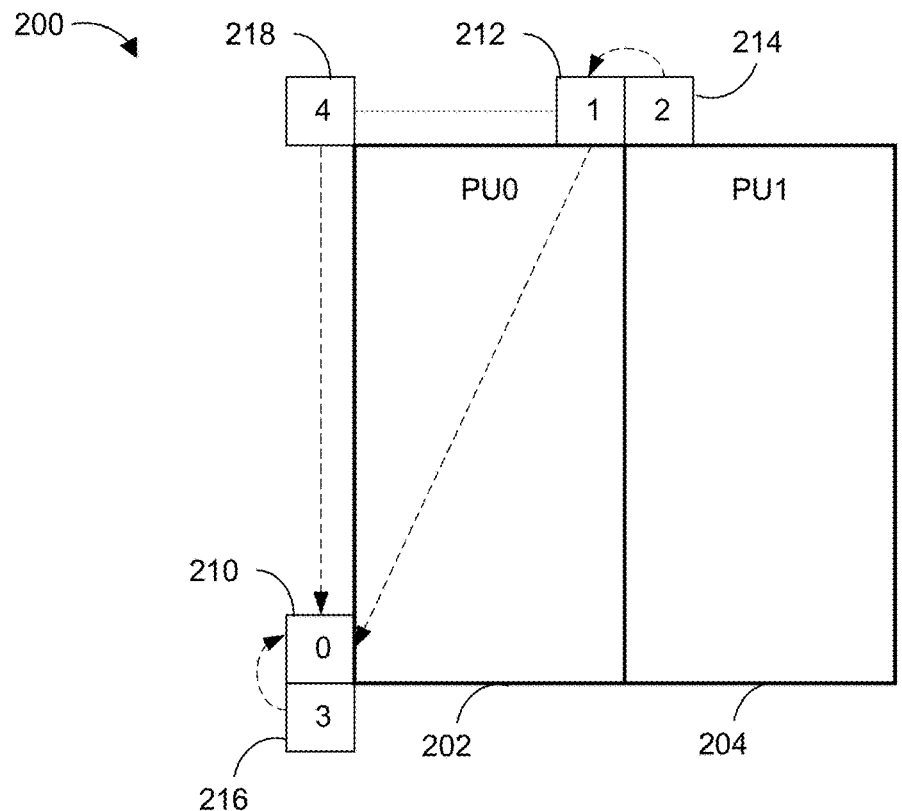
FIG. 2A is a conceptual diagram illustrating example spatial neighboring motion vector candidates for a merge mode, in accordance with some examples of the disclosure.
Figure 2B:
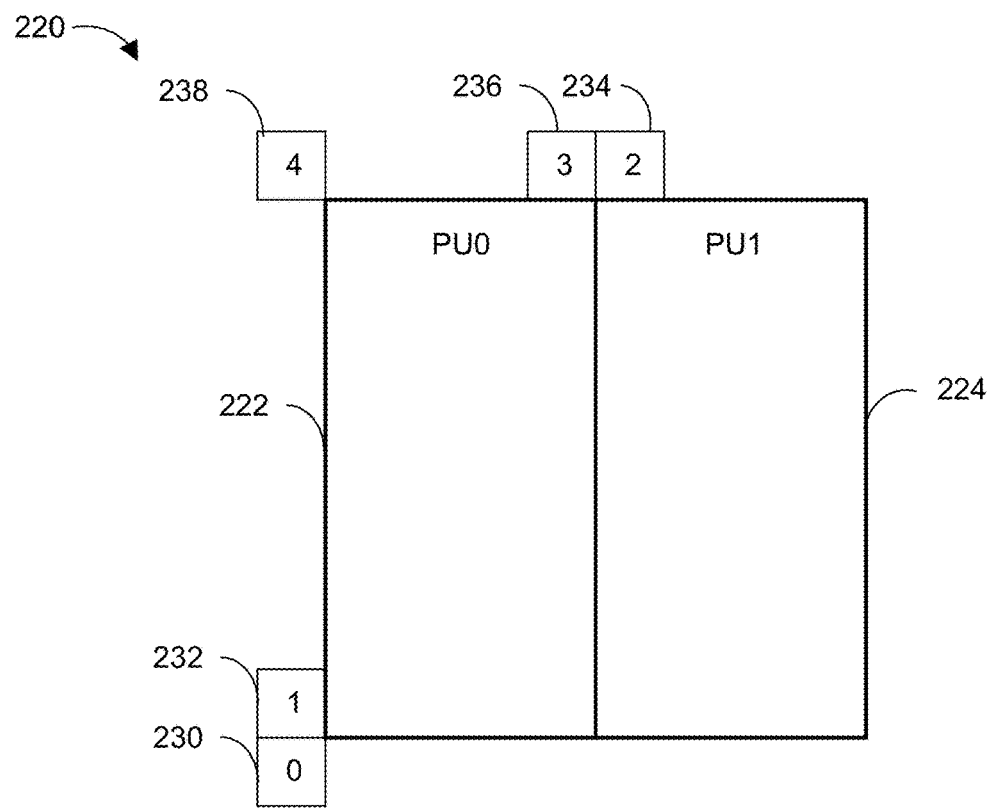
FIG. 2B is a conceptual diagram illustrating example spatial neighboring motion vector candidates for an advanced motion vector prediction (AMVP) mode, in accordance with some examples of the disclosure.

The candidates for both modes can be derived from spatial and/or temporal neighboring blocks. For example, FIG. 2A and FIG. 2B include conceptual diagrams illustrating spatial neighboring candidates. FIG. 2A illustrates spatial neighboring motion vector (MV) candidates for merge mode. FIG. 2B illustrates spatial neighboring motion vector (MV) candidates for AMVP mode. Spatial MV candidates are derived from the neighboring blocks for a specific PU (PU10), although the methods generating the candidates from the blocks differ for merge and AMVP modes.

In merge mode, the encoder can form a merging candidate list by considering merging candidates from various motion data positions. For example, as shown in FIG. 2A, up to five spatial MV candidates can be derived with respect to spatially neighboring motion data positions shown with numbers 0-4 in FIG. 2A. The MV candidates can be ordered in the merging candidate list in the order shown by the numbers 0-4. For example, the positions and order can include: left position (0), above position (1), above right position (2), below left position (3), and above left position (4). In FIG. 2A, block 200 includes PU0 202 and PU1 204. In some examples, when a video coder is to code motion information for PU0 202 using merge mode, the video coder can add motion information from spatial neighboring block 210, spatial neighboring block 212, spatial neighboring block 214, spatial neighboring block 216, and spatial neighboring block 218 to a candidate list, in the order described above.

In AVMP mode shown in FIG. 2B, the neighboring blocks are divided into two groups: left group including the blocks 0 and 1, and above group including the blocks 2, 3, and 4. In FIG. 2B, the blocks 0, 1, 2, 3, and 4 are labeled, respectively, as blocks 230, 232, 234, 236, and 238. Here, block 220 includes PU0 222 and PU1 224, and blocks 230, 232, 234, 236, and 238 represent spatial neighbors to PU0 222. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate, thus the temporal distance differences can be compensated.

Figure 3A:
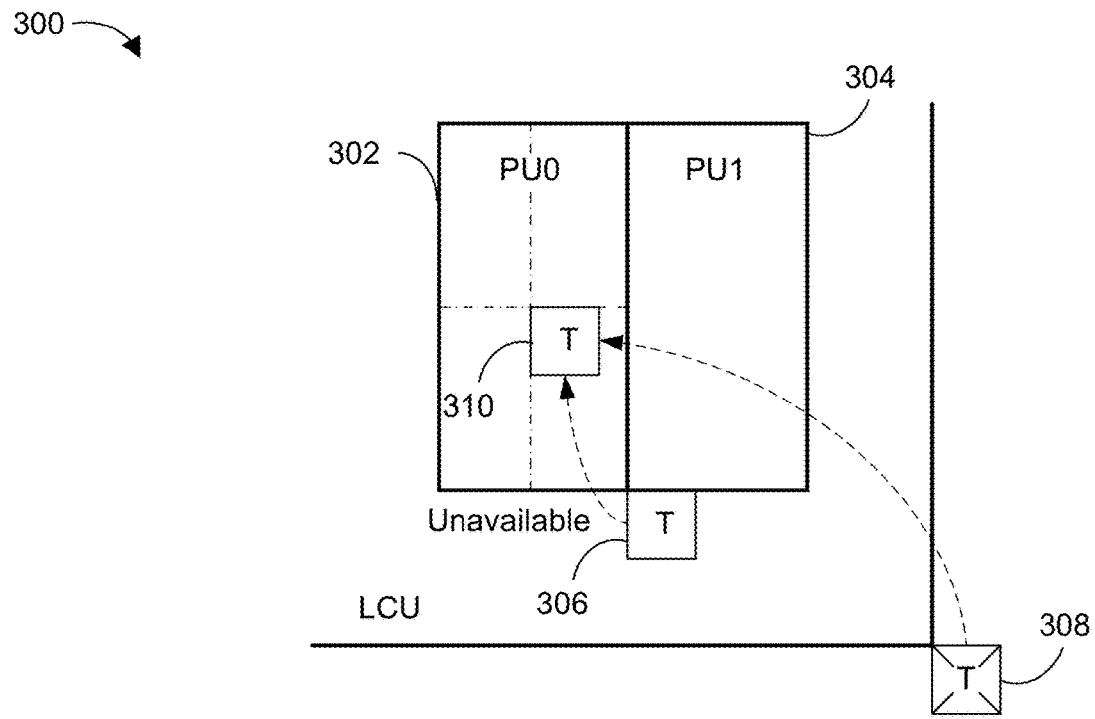
FIG. 3A is a conceptual diagram illustrating an example temporal motion vector predictor (TMVP) candidate, in accordance with some examples of the disclosure.
Figure 3B:
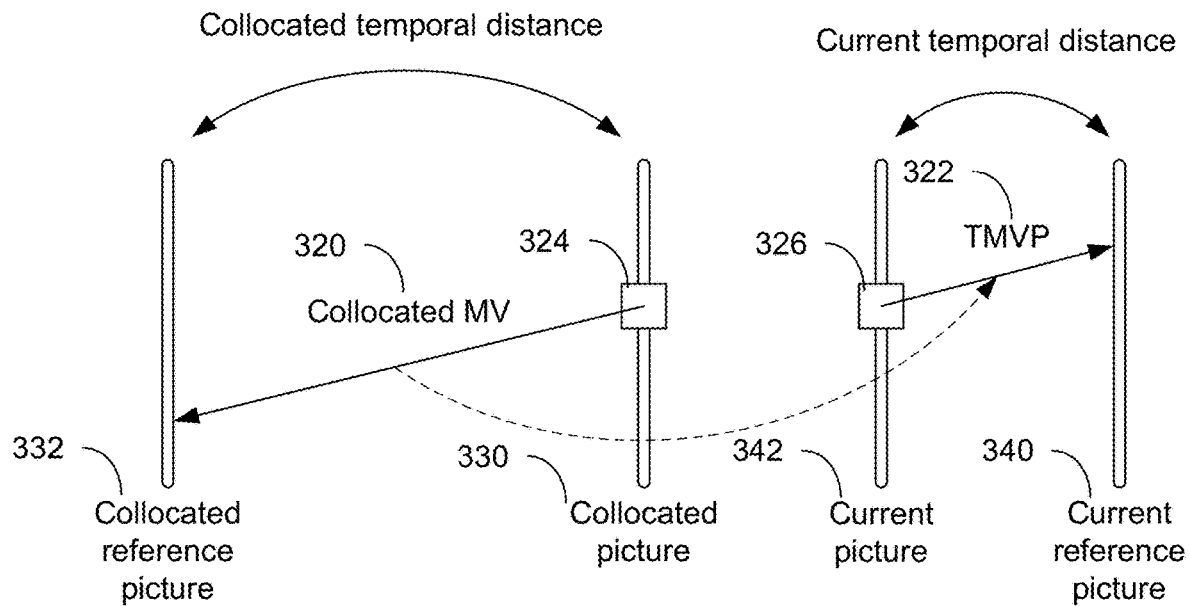
FIG. 3B is a conceptual diagram illustrating an example of motion vector scaling, in accordance with some examples of the disclosure.

FIG. 3A and FIG. 3B include conceptual diagrams illustrating temporal motion vector prediction. FIG. 3A illustrates an example CU 300 including PU0 302 and PU1 304. PU0 302 includes a center block 310 for PU0 302 and a bottom-right block 306 to PU0 302. FIG. 3A also shows an external block 308 for which motion information may be predicted from motion information of PU0 302, as discussed below. FIG. 3B illustrates a current picture 342 including a current block 326 for which motion information is to be predicted. FIG. 3B also illustrates a collocated picture 330 to current picture 342 (including collocated block 324 to current block 326), a current reference picture 340, and a collocated reference picture 332. Collocated block 324 is predicted using collocated motion vector 320, which is used as a temporal motion vector predictor (TMVP) candidate 322 for motion information of current block 326.

A video coder can add a temporal motion vector predictor (TMVP) candidate (e.g., TMVP candidate 322), if enabled and available, into a MV candidate list after any spatial motion vector candidates. The process of motion vector derivation for a TMVP candidate is the same for both merge and AMVP modes. In some instances, however, the target reference index for the TMVP candidate in the merge mode is always set to zero.

The primary block location for TMVP candidate derivation is the bottom right block 306 outside of the collocated PU 304, as shown in FIG. 3A, to compensate for the bias to the above and left blocks used to generate spatial neighboring candidates. However, if block 306 is located outside of the current CTB (or LCU) row (e.g., as illustrated by block 308 in FIG. 3A) or if motion information for block 306 is not available, the block is substituted with center block 310 of PU 302.

With reference to FIG. 3B, a motion vector for TMVP candidate 322 can be derived from collocated block 324 of collocated picture 330, indicated in the slice level. Similar to temporal direct mode in AVC, a motion vector of the TMVP candidate may be subject to motion vector scaling, which is performed to compensate for distance differences between current picture 342 and current reference picture 340, and collocated picture 330 and collocated reference picture 332. That is, motion vector 320 can be scaled to produce TMVP candidate 322 based on the distance differences between a current picture (e.g., current picture 342) and a current reference picture (e.g., current reference picture 340), and a collocated picture (e.g., collocated picture 330) and a collocated reference picture (e.g., collocated reference picture 332).

Other aspects of motion prediction are covered in the HEVC standard and/or other standard, format, or codec. For example, several other aspects of merge and AMVP modes are covered. One aspect includes motion vector scaling. With respect to motion vector scaling, it can be assumed that the value of motion vectors is proportional to the distance of pictures in the presentation time. A motion vector associates two pictures—the reference picture and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. Moreover, the motion vector can be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Another aspect of motion prediction includes artificial motion vector candidate generation. For example, if a motion vector candidate list is not complete, artificial motion vector candidates are generated and inserted at the end of the list until all candidates are obtained. In merge mode, there are two types of artificial MV candidates: combined candidate derived only for B-slices; and zero candidates used only for AMVP if the first type does not provide enough artificial candidates. For each pair of candidates that are already in the candidate list and that have necessary motion information, bi-directional combined motion vector candidates are derived by a combination of the motion vector of the first candidate referring to a picture in the list 0 and the motion vector of a second candidate referring to a picture in the list 1.

In some implementations, a pruning process can be performed when adding or inserting new candidates into an MV candidate list. For example, in some cases it is possible for MV candidates from different blocks to include the same information. In such cases, storing duplicative motion information of multiple MV candidates in the MV candidate list can lead to redundancy and a decrease in the efficiency of the MV candidate list. In some examples, the pruning process can eliminate or minimize redundancies in the MV candidate list. For example, the pruning process can include comparing a potential MV candidate to be added to an MV candidate list against the MV candidates which are already stored in the MV candidate list. In one illustrative example, the horizontal displacement ($\Delta x$) and the vertical displacement ($\Delta y$) (indicating a position of a reference block relative to a position of the current block) of a stored motion vector can be compared to the horizontal displacement ($\Delta x$) and the vertical displacement ($\Delta y$) of the motion vector of a potential candidate. If the comparison reveals that the motion vector of the potential candidate does not match any of the one or more stored motion vectors, the potential candidate is not considered as a candidate to be pruned and can be added to the MV candidate list. If a match is found based on the comparison, the potential MV candidate is not added to the MV candidate list, avoiding the insertion of an identical candidate. In some cases, to reduce complexity, only a limited number of comparisons are performed during the pruning process instead of comparing each potential MV candidate with all existing candidates.

In certain coding schemes, such as HEVC, weighted prediction (WP) is supported, in which case a scaling factor (denoted by a), a shift number (denoted by s) and an offset (denoted by b) is used in the motion compensation. Suppose the pixel value in position (x, y) of the reference picture is p(x, y), then p'(x, y)=((a*p(x, y)+(1<<(s−1)))>>s)+b instead of p(x, y) is used as the prediction value in motion compensation.

When WP is enabled, for each reference picture of current slice, a flag is signaled to indicate whether WP applies for the reference picture or not. If WP applies for one reference picture, a set of WP parameters (i.e., a, s and b) is sent to the decoder and is used for motion compensation from the reference picture. In some examples, to flexibly turn on/off WP for luma and chroma component, WP flag and WP parameters are separately signaled for luma and chroma component. In WP, one same set of WP parameters is used for all pixels in one reference picture.

Figure 4A:
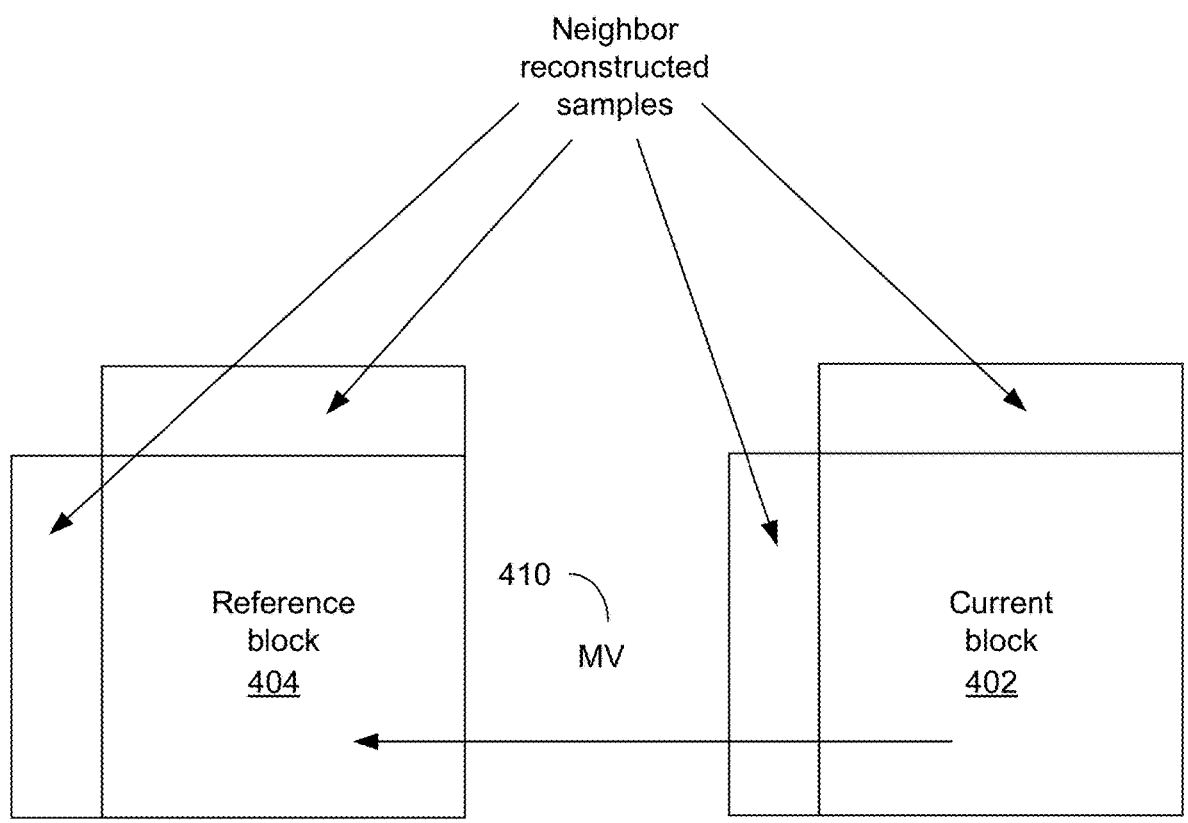
FIG. 4A is a conceptual diagram illustrating an example of neighboring samples of a current coding unit used for estimating motion compensation parameters for the current coding unit, in accordance with some examples of the disclosure.
Figure 4B:
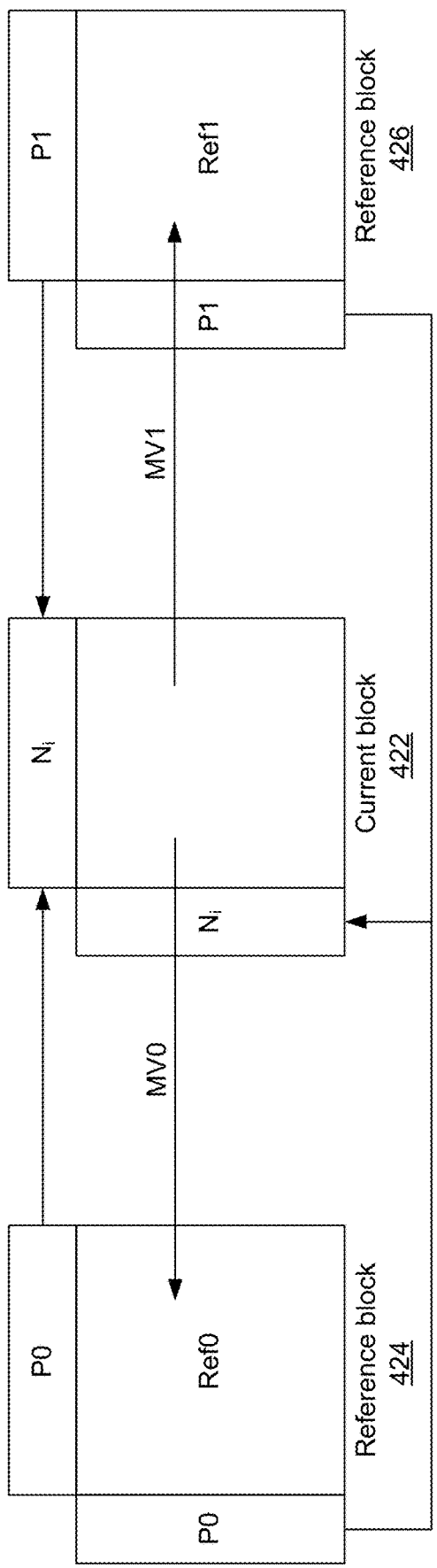
FIG. 4B is a conceptual diagram illustrating an example of neighboring samples of a reference block used for estimating motion compensation parameters for a current coding unit, in accordance with some examples of the disclosure.

FIG. 4A is a diagram illustrating an example of neighbor reconstructed samples of a current block 402 and neighbor samples of a reference block 404 used for uni-directional inter-prediction. A motion vector MV 410 can be coded for the current block 402, where the MV 410 can include a reference index to a reference picture list and/or other motion information for identifying the reference block 404. For example, the MV can include a horizontal and a vertical component that provides an offset from the coordinate position in the current picture to the coordinates in the reference picture identified by the reference index. FIG. 4B is a diagram illustrating an example of neighbor reconstructed samples of a current block 422 and neighbor samples of a first reference block 424 and a second reference block 426 used for bi-directional inter-prediction. In such a case, two motion vectors MV0 and MV1 can be coded for the current block 422 to identify the first reference block 424 and a second reference block 426, respectively.

As previously explained, OBMC is an example motion compensation technique that can be implemented for motion compensation. OBMC can increase prediction accuracy and avoid blocking artifacts. In OBMC, the prediction can be or include a weighted sum of multiple predictions. In some cases, blocks can be larger in each dimension and can overlap quadrant-wise with neighboring blocks. Thus, each pixel may belong to multiple blocks. For example, in some illustrative cases, each pixel may belong to 4 blocks. In such a scheme, OBMC may implement four predictions for each pixel which are summed up to a weighted mean.

In some cases, OBMC can be switched on and off using a particular syntax at the CU level. In some examples, there are two direction modes (e.g., top, left, right, bottom or below) in OBMC, including a CU-boundary OBMC mode and a subblock-boundary OBMC mode. When CU-boundary OBMC mode is used, the original prediction block using the current CU MV and another prediction block using a neighboring CU MV (e.g., an "OBMC block") are blended. In some examples, the top-left subblock in the CU (e.g., the first or left-most subblock on the first/top row of the CU) has top and left OBMC blocks, and the other top-most subblocks (e.g., other subblocks on the first/top row of the CU) may only have top OBMC blocks. Other left-most subblocks (e.g., subblocks on the first column of the CU on the left side of the CU) may only have a left OBMC block.

Subblock-boundary OBMC mode may be enabled when a sub-CU coding tool is enabled in the current CU (e.g., affine motion compensated prediction, advanced temporal motion vector prediction (ATMVP), etc.) that allows for different MVs on a subblock basis. In subblock-boundary OBMC mode, separate OBMC blocks using MVs of connected neighboring subblocks can be blended with the original prediction block using the MV of the current subblock. In some examples, in subblock-boundary OBMC mode, separate OBMC blocks using MVs of connected neighboring subblocks can be blended in parallel with the original prediction block using the MV of the current subblock, as further described herein. In other examples, in subblock-boundary mode, separate OBMC blocks using MVs of connected neighboring subblocks can be blended sequentially with the original prediction block using the MV of the current subblock. In some cases, CU-boundary OBMC mode can be performed before subblock-boundary OBMC mode, and a predefined blending order for subblock-boundary OBMC mode may include top, left, bottom, and right.

Prediction based on the MV of a neighboring subblock N (e.g., subblocks above the current subblock, to the left of the current subblock, below the current subblock, and to the right of the current subblock), may be denoted as PN and prediction based on the MV of the current subblock may be denoted as Pc. When a subblock N contains the same motion information as the current subblock, the original prediction block may not be blended with the prediction block based on the MV of subblock N. In some cases, the samples of 4 rows/columns in PN may be blended with the same samples in Pc.

Figure 5:
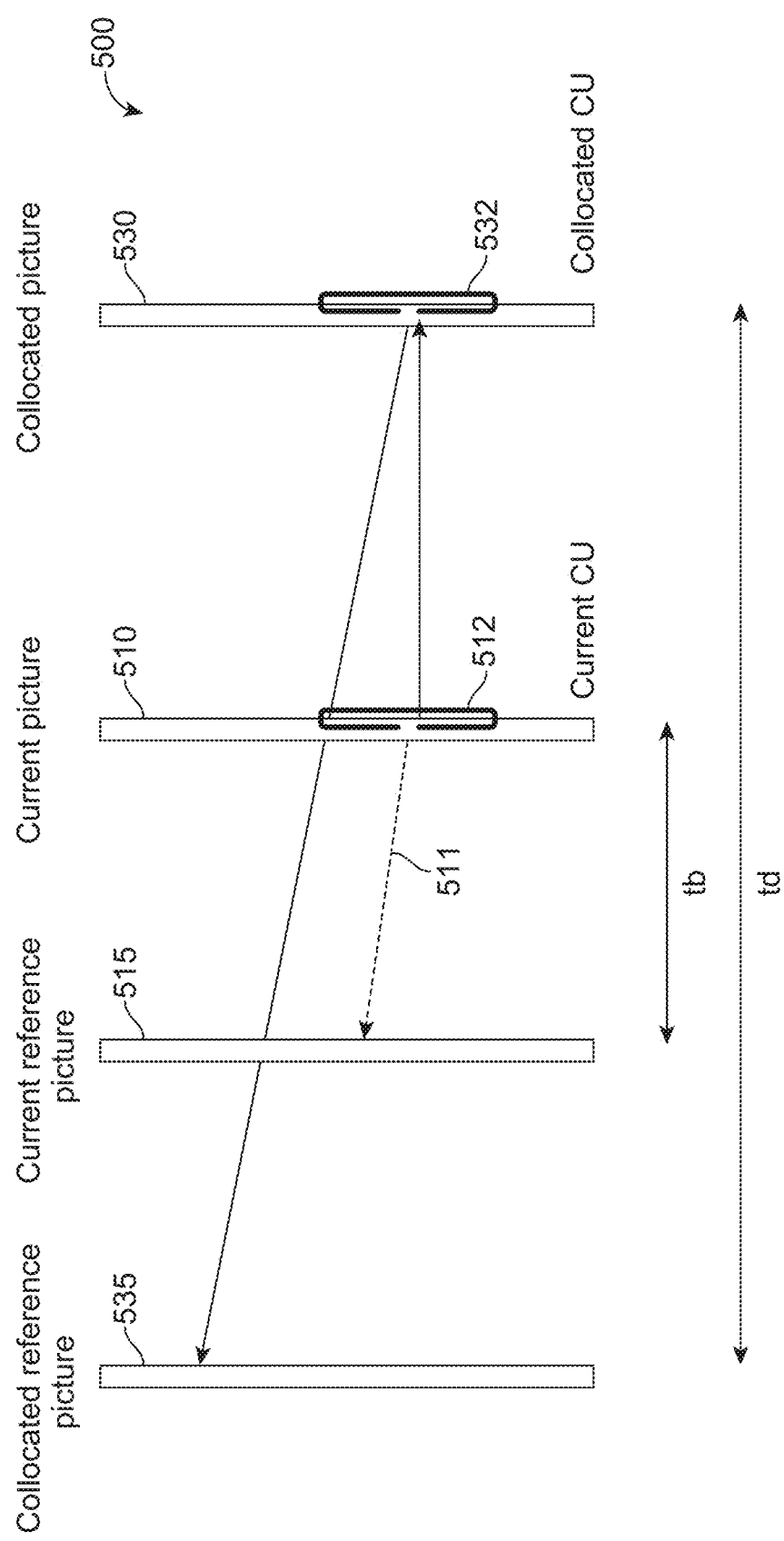
FIG. 5 illustrates aspects of motion vector scaling for temporal merge candidates for use in processing a block, in accordance with some examples of the disclosure.

FIG. 5 illustrates aspects of motion vector scaling 500 for temporal merge candidates for use in processing a block in accordance with some examples of the disclosure. In some examples, temporal merge candidate derivation can be performed wherein one merge candidate (e.g., a temporal merge candidate) is added to the merge candidate list. Temporal merge candidate derivation can be performed based on a scaled motion vector. The scaled motion vector can be derived based on a collocated CU included in a collocated reference picture. The reference picture list to be used for derivation of the collocated CU can be explicitly signaled in the slice header.

For example, FIG. 5 depicts a current picture 510 and a collocated picture 530, which may be associated with a current reference picture 515 and a collocated reference picture 535, respectively. FIG. 5 also depicts a current CU 512 (e.g., associated with current picture 510) and a collocated CU (e.g., associated with collocated picture 530). In some examples, a scaled motion vector for temporal merge candidate derivation can be derived or obtained as illustrated in FIG. 5. For example, FIG. 5 depicts a dotted line 511, which is scaled from the motion vector of collocated CU 532 using the Picture Order Count (POC) distances, tb and td. In some examples, tb is the POC difference between current reference picture 515 and current picture 510 and td is the POC difference between the collocated reference picture 535 and collocated picture 530. The reference picture index of the temporal merge candidate can be set equal to zero.

Figure 6A:
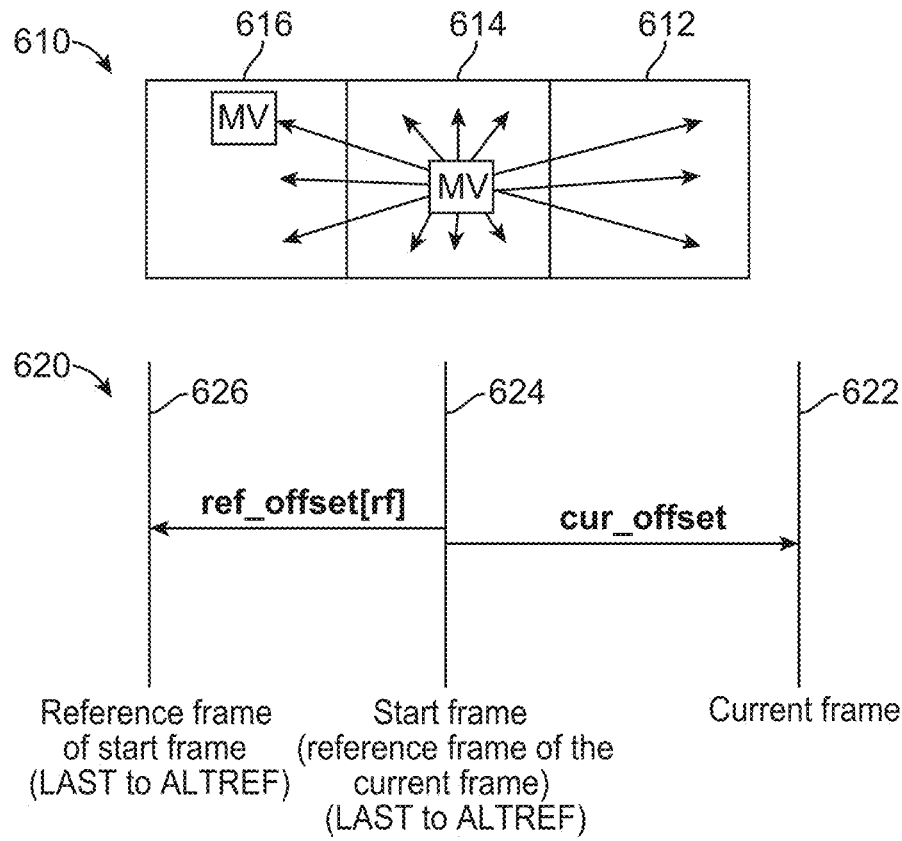
FIG. 6A illustrates an example of collocated motion vector projection, in accordance with some examples of the disclosure.
Figure 6B:
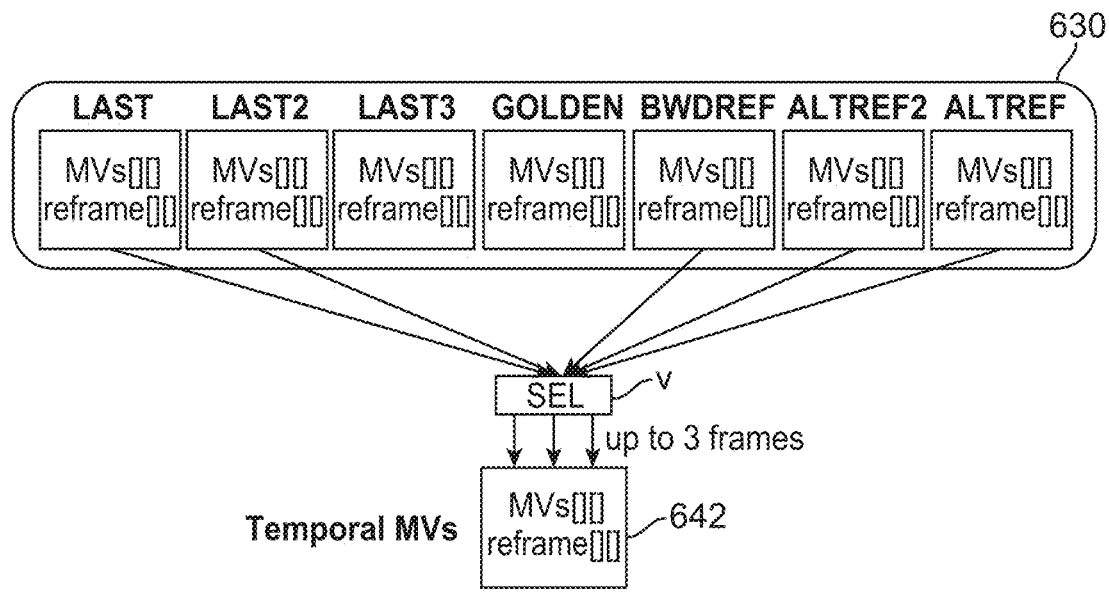
FIG. 6B illustrates an example of available types of collocated reference frames, in accordance with some examples of the disclosure.

FIG. 6A illustrates aspects of collocated motion vector projection 610 and 620 for use in processing a block in accordance with some examples of the disclosure. FIG. 6B illustrates aspects of various reference frames that can be used as temporal collocated reference frames for collocated motion vector projection.

The AV1 codec supports up to seven reference frames for inter frame prediction. For example, as illustrated in FIG. 6B, AV1 may support a set of reference frames 630 that includes some (or all) of the LAST, LAST2, LAST3, GOLDEN, BWDREF, ALTREF2, and ALTREF reference frames. The set of seven reference frames 630 can be used to perform inter frame prediction. In some cases, each reference frame of the set of reference frames 630 may be associated with one or more motion vectors. In some aspects, up to three reference frames (e.g., three of the seven reference frames illustrated in FIG. 6B) can be used as temporal collocated reference frames. In one illustrative example, the up to three reference frames that can be used as temporal collocated reference frames can be selected from a set of five reference frames. The five reference frames from which the up to three temporal collocated reference frames are selected can include the LAST, LAST2, BWDREF, ALTREF2, and ALTREF reference frames illustrated in FIG. 6B. In some aspects, a selection process 632 can be used to select up to three temporal collocated reference frames, wherein the selected temporal collocated reference frames are associated with a set of temporal motion vectors 642. As described previously, motion vectors of the collocated reference frame(s) (e.g., the temporal motion vectors 642) can be used to perform collocated motion vector projection.

FIG. 6A illustrates an example of collocated motion vector projection 610, 620. In some cases, collocated motion vector projection can be performed based on projecting some (or all) of the temporal motion vectors 642 with respect to a current frame and its reference frame. For example, one or more temporal motion vectors 642 associated with a start frame 624 (e.g., the reference frame of the current frame 622) can be projected with respect to current frame 622 using one or more current frame offsets, cur offsets. The one or more temporal motion vectors 642 associated with start frame 624 can additionally be projected with respect to reference frame 626 (e.g., which is the reference frame of start frame 624) using one or more reference frame offsets, ref_offset[rf].

The example of collocated motion vector projection 610 presents a simplified representation of collocated motion vector projection 620 (e.g., current frame 622 can correspond to or be the same as block 612, start frame 624 can correspond to or be the same as block 614, reference frame 626 can correspond to or be the same as block 616). In one illustrative example, blocks 612, 614, and 616 are 64×64 in size. In some aspects, the projection of a given one of the temporal motion vectors 642 can be valid when the projection is located within the block from which the projection is associated, or if the projection is located within one of the horizontally adjacent blocks. For example, when the temporal motion vectors 642 are projected based on block 614, a given projection can be valid if the given projection is located within block 614 (e.g., the block from which the projection is associated) or if the given projection is located within block 612 or block 616 (e.g., the two horizontally adjacent blocks relative to block 614).

In some examples, collocated motion vector projection can be performed for up to three collocated reference frames, referred to as REF0, REF1, and REF2. The motion vectors associated with REF0 (e.g., obtained from or included in the set of temporal motion vectors 642) can be projected first. In one illustrative example, for a 64×64 block size, the motion vectors associated with REF0 can be projected in 8×8 raster scan order for the entire frame. Valid projections of the REF0 MVs can be located within the 64×64 REF0 block or located within one of the 64×64 blocks horizontally adjacent to the REF0 block. Projections that are located outside of one of the three 64×64 blocks can be treated as invalid. After determining the valid projections of the REF0 MVs, motion vectors associated with REF1 and REF2 can be projected using the same process as described above. In some aspects, the projection of the MVs associated with REF0, REF1, and REF2 (e.g., the set of temporal motion vectors 642) can be performed sequentially, such that MV projections associated with REF1 will overwrite MV projections associated with REF0 if both projections are to the same location within one of the three adjacent 64×64 blocks, and MV projections with REF2 will overwrite MV projections with REF1 if both projections are to the same location. In some cases, sequentially projecting REF0, REF1, and REF2 with subsequent projections overwriting any MV projection already present at the same location can be used to provide the MV projections associated with REF2 with a greatest relative priority and the MV projections associated with REF0 with a lowest relative priority.

FIGS. 7A-D illustrate an example of collocated motion vector projection performed based on two collocated reference frames (e.g., LAST_FRAME and ALT_FRAME). FIG. 7A illustrates an example of motion vector references included in LAST_FRAME (e.g., prior to performing motion vector projection). Arrows originating in each of the motion vector references may represent scaled motion vectors that can be used to perform collocated motion vector projection for LAST_FRAME. The terminal end of each arrow represents the block location to which the corresponding motion vector reference within LAST_FRAME is to be projected (e.g., based on the scaled motion vector determined for the corresponding motion vector reference within LAST_FRAME).

FIG. 7B illustrates the motion vector field projection generated for LAST_FRAME based on the scaled motion vectors depicted in FIG. 7A. Block locations with which no motion vector projection is associated (e.g., empty block locations) can be set to zero or treated as invalid. In some aspects, the motion vector field projection of FIG. 7B can be generated by performing collocated motion vector projection for LAST_FRAME (e.g., as illustrated in FIG. 7A) in raster scan order. If a motion vector is projected to a location within the motion vector field projection that is empty or unoccupied, the projected motion vector can be written to the projected location. For example, processing LAST_FRAME in raster scan order results in MV ref_frame 702 being processed first. Based on the scaled motion vector associated with MV ref_frame 702, MV ref_frame 702 is projected and written to location 730, which is currently empty. The raster scan order processing may then proceed to MV ref_frame 704. Based on the scaled motion vector associated with MV ref_frame 704, MV ref_frame 704 is also projected to the same location 730, which is now occupied by the projected MV ref_frame 702. Because MV ref_frame 704 is projected at a later point in the raster scan order than MV ref_frame 702, the conflict between multiple MV ref frames being projected to the same location 730 can be resolved by allowing the later projection of MV ref_frame 704 to overwrite the earlier projection of MV ref_frame 702. As illustrated in FIG. 7B, the location 730 is occupied by the projected MV ref_frame 704 in the final motion vector field projection determined for LAST_FRAME.

FIG. 7C illustrates a second example of motion vector references and scaled motion vectors associated with a second collocated reference frame, ALT_FRAME. The motion vector references included in ALT_FRAME can be projected based on the associated scaled motion vectors in a manner the same as or similar to that described above with respect to the projection of LAST_FRAME (e.g., as illustrated in FIG. 7A) to determine the motion vector field projection for LAST_FRAME (e.g., as illustrated in FIG. 7B).

The motion vector references depicted in FIG. 7C (e.g., the MV ref frames included in ALT_FRAME) can be projected onto the motion vector field projection previously determined for LAST_FRAME, with the motion vector projections associated with ALT_FRAME overwriting any existing projections associated with LAST_FRAME that are located at the same position within the motion vector field projection. The resulting motion vector field projection determined for LAST_FRAME and ALT_FRAME is illustrated in FIG. 7D.

In some examples, MV ref_frame 714 (e.g., included in ALT_FRAME as depicted in FIG. 7C) can be projected to location 730. As mentioned previously, the MV ref frames included in ALT_FRAME can be projected onto the motion vector field projection determined for LAST_FRAME and illustrated in FIG. 7B. In the LAST_FRAME motion vector field projection, location 730 is occupied by LAST_FRAME MV ref_frame 704.

When ALT_FRAME MV ref_frame 730 is projected to the same location 730 (e.g., during collocated motion vector projection for ALT_FRAME), ALT_FRAME MV ref_frame 730 can overwrite LAST_FRAME MV ref_frame 704. In one illustrative example, motion vector projection can be performed for ALT_FRAME in raster scan order (e.g., as described above). Based on the raster scan order, ALT_FRAME MV ref_frame 716 is subsequently also projected to the same location 730, which is now occupied by the ALT_FRAME MV ref_frame 714. The later projected ALT_FRAMEMV ref_frame 716 can overwrite the earlier projected ALT_FRAMEMV ref_frame 716.

As illustrated in FIG. 7D, the resulting motion vector field projection determined for LAST_FRAME and ALT_FRAME includes only the later projected ALT_FRAME MV ref_frame 716 at location 730. In some aspects, when a third collocated reference frame is used to perform collocated motion vector projection, the third collocated reference frame can be projected onto the LAST_FRAME+ALT_FRAME motion vector field projection illustrated in FIG. 7D in a same or similar manner as that described above with respect to FIGS. 7A-D, with location conflicts (e.g., an MV projection to an already occupied location within the motion vector field projection) resolved by overwriting an earlier projection with the later projection.

Figure 8A:
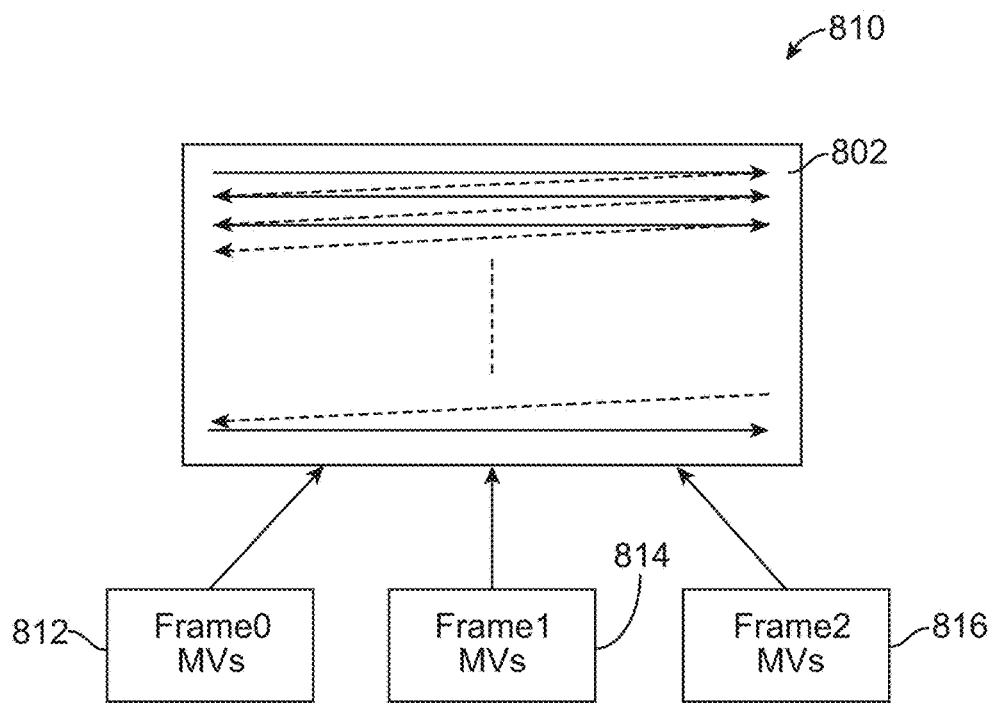
FIG. 8A illustrates an example of a frame-level raster scan order that may be used to perform collocated motion vector projection, in accordance with some examples of the disclosure.
Figure 8B:
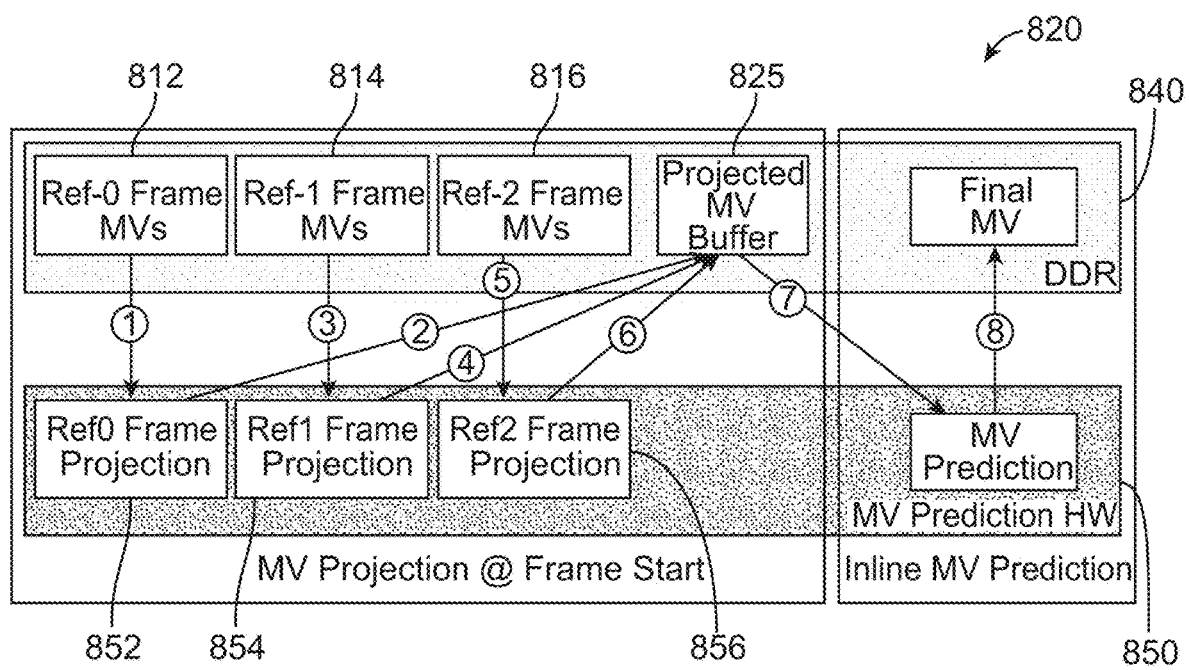
FIG. 8B illustrates an example diagram of a system for performing collocated motion vector projection based on a frame-level raster scan, in accordance with some examples of the disclosure.

FIGS. 8A and 8B illustrate aspects of collocated motion vector projection based on frame-level processing. For example, FIG. 8A illustrates an example of a frame-level raster scan order 810 that can be used to perform collocated motion vector projection for a currently decoded frame 802. The collocated motion vector projection can be performed based on a first set of MVs 812 associated with a first collocated reference frame (e.g., indicated in FIG. 8A as 'Frame® MVs'), a second set of MVs 814 associated with a second collocated reference frame (e.g., indicated in FIG. 8A as 'Frame1 MVs'), and a third set of MVs 816 associated with a third collocated reference frame (e.g., indicated in FIG. 8A as 'Frame2 MVs').

In one illustrative example, the first, second, and third collocated reference frames described above can be associated with or obtained based on the currently decoded frame 802. Collocated motion vector projection can be performed for currently decoded frame 802 by first reading the first set of MVs 812 from memory and projecting each MV of the first set of MVs 812 using the frame-level raster scan order depicted in FIG. 8A. For example, the first set of MVs 812 can be projected in a manner the same as or similar to the collocated motion vector projection described above with respect to FIGS. 6A-7D. In some aspects, the projected motion vectors (e.g., the motion vector field projection) determined based on projecting the first set of MVs 812 in the frame-level raster scan order can be written to or otherwise stored in a buffer or memory associated with a decoding device used to decode current frame 802.

For example, FIG. 8B illustrates an example diagram of a system 820 implementing collocated motion vector projection with the frame-level raster scan order 810. REF0 frame MVs 812 are read from DDR (e.g., memory) 840 and used to generate a REF0 frame MV projection 852. In some aspects, the REF0 frame MVs 812 and the first set of MVs 812 can be the same. The REF0 MVs 812 can be read from memory 840 and sequentially projected using the frame-level raster scan order 810. As each REF0 MV 812 is projected, the resulting motion vector projections can be written to a projected MV buffer 825 included in memory 840.

After all of the REF0 MVs 812 have been projected and written to projected MV buffer 825, the example system 820 can then repeat the same process for the REF1 MVs 814. The REF1 MVs 814 can be used to determine a REF1 frame MV projection 854, again using the frame-level raster scan order 810. Each entry of the REF1 frame MV projection 854 can be written to the projected MV buffer 825, with the REF1 frame MV projection entries overwriting any REF0 MV projection entries already stored in the projected MV buffer 825 at the same location (e.g., by overwriting existing entries as described above with respect to FIGS. 7A-D). After all of the REF1 MVs 814 have been projected and written to projected MV buffer 825, the example system 820 can then again repeat the same process for the REF2 MVs 816.

In some cases, by using the frame-level raster scan order 810 to perform each of the three sequential motion vector projections (e.g., for REF0 MVs 812, REF1 MVs 814, and REF2 MVs 816), the example system 820 performs three sequential raster scans, each over the whole frame 802. Projected MV buffer 825 must additionally be sized to store MV projection entries over the whole frame 802, as the frame 802 cannot be decoded until motion vector projection has been completed for all three of the collocated reference frames (e.g., REF0, REF1, REF2).

In some aspects, sequentially performing motion vector projection for each of the collocated reference frames associated with the currently decoded frame 802 can consume a large number of compute cycles (e.g., clock cycles of one or more processors, etc.) at the beginning of decoding the frame 802. For example, a large number of clock cycles may be consumed while the example system 802 waits for the frame-level raster scan order motion vector projection to be sequentially completed for the three collocated reference frames REF0, REF1, and REF2. In some cases, the sequential process of projecting the MVs associated with REF0, REF1, and REF2 is itself sequential with the decoding of frame 802, which may introduce further inefficiency and/or latency to the MV projection-based decoding of frame 802.

As illustrated in FIG. 8B, performing collocated motion vector projection by processing three collocated reference frames in a frame-level raster scan order may be associated with four read operations and four write operations of collocated data. For example, the four read operations may include three read operations to read the REF0, REF1, and REF2 MV data (e.g., 812, 814, and 816, respectively) prior to performing the respective MV projection for each reference frame, and a fourth read operation to read the final contents of projected MV buffer 825 to perform MV prediction at MV prediction hardware 850. The four write operations can include three write operations to write the REF0, REF1, and REF2 motion vector projections to the projected MV buffer 825, and a fourth write operation to write the final MV prediction for the current frame 802 from MV prediction hardware 850 to memory 840.

There is a need to reduce the quantity of clock cycles used to perform collocated motion vector projection for one or more (e.g., up to three) collocated reference frames. There is a need to reduce the read/write bandwidth associated with using collocated motion vector projection to decode frames of video data. There is a further need to reduce the size (e.g., storage capacity) of one or more buffers associated with storing projected motion vectors determined when performing collocated motion vector projection.

The systems and techniques described herein can be used to perform on-the-fly collocated motion vector projection based on a block-based processing order. As will be described in greater depth below, the systems and techniques can be used to read and project reference frame motion vectors at the block level. In one illustrative example, in scenarios in which a currently decoded frame of video data is associated with three collocated reference frames (e.g., REF0, REF1, REF2), the associated motion vector data included in the three collocated reference frames can be read and projected at a 64×64 block level. In some aspects, the associated motion vector data included in the collocated reference frames can be read and projected at a 128×128 block level. In some aspects, the systems and techniques can avoid writing projected motion vectors to DDR or other memory (e.g., as in the example of FIG. 8B) based using the block-based processing order described herein for performing collocated motion vector projection. In one illustrative example, the systems and techniques can include one or more MV projection buffers implemented in hardware, wherein the one or more MV projection buffers are sized to be three times larger than the block-level size (e.g., for a 64×64 block level, the one or more MV projection buffers can be sized to store three 64×64 blocks; for a 128×128 block level, the one or more MV projection buffers can be sized to store three 128×128 blocks).

Figure 9A:
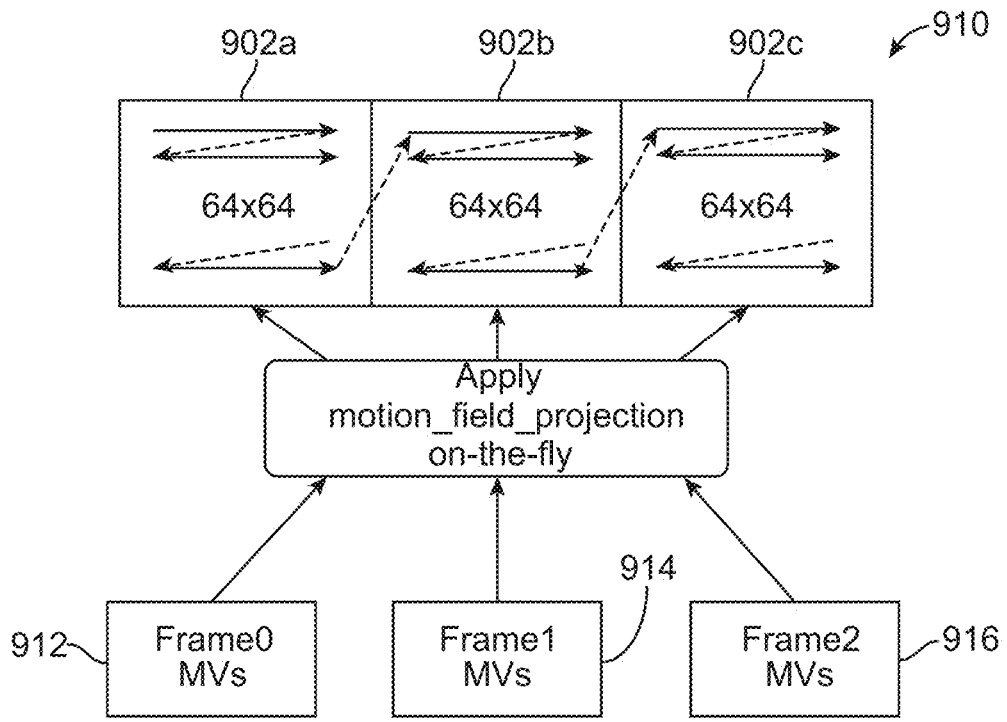
FIG. 9A illustrates an example of a block-level raster scan order that may be used to perform collocated motion vector projection, in accordance with some examples of the disclosure.

FIG. 9A is a diagram illustrating an example of a block-based (e.g., block-level) processing 910 that can be used to more efficiently perform collocated motion vector projection. For example, a currently decoded frame of video data can be divided into a plurality of blocks, and collocated motion vector projection can be performed for each block of the currently decoded frame of video data. In the example block-based processing of FIG. 9A, three blocks (e.g., 902a, 902b, and 902c) of video data are illustrated. In some cases, a greater or lesser quantity of blocks can be utilized per decoded frame of video data. Blocks 902a-c are illustrated as having a size of 64×64, although other block sizes (e.g., such as 128×128) may also be utilized.

In one illustrative example, the same block-level (e.g., block size) associated with the blocks of video data 902a-c can be used to obtain blocks of MV information from one or more collocated reference frames. The collocated reference frames can be associated with the currently decoded frame of video data and can include one or more of the example collocated reference frames described above with respect to FIG. 6B. In one illustrative example, the one or more collocated reference frames can include a first collocated reference frame REF0, a second collocated reference frame REF1, and a third collocated reference frame REF2.

MV information associated with the collocated reference frames can be read and projected at the same block-level (e.g., block size) that is associated with the blocks of video data included in the currently decoded frame. For example, if the blocks of video data 902a-c are 64×64 in size, the first block of video data 902a can be decoded based on reading 64×64 blocks of MV information from the collocated reference frames. The 64×64 blocks of MV information obtained for the collocated reference frames can be projected into a single 64×64 motion vector field projection generated for the first block of video data 902a, and the first block of video data 902a can be decoded based on determining that the projection of the associated 64×64 motion vector field projection has been completed.

In one illustrative example, a given block of video data (e.g., first block 902a) can be decoded in parallel with collocated motion vector projection operations performed for one or more additional and/or subsequent blocks of the video data. For example, first block 902a can be decoded when collocated motion vector projection operations have been completed for first block 902a and second block 902b (e.g., first block 902a can be decoded in parallel with collocated motion vector projection operations performed for third block 902c). Second block 902b can be decoded when collocated motion vector projection operations have been completed for second block 902b and third block 902c (e.g., second block 902b can be decoded in parallel with collocated motion vector projection operations performed for a fourth block). For example, a given block of video data can be decoded based on determining that MV projection has been completed for the given block and the neighboring or adjacent blocks for the given block, with the decoding performed independently from the MV projection operations for subsequent, non-adjacent blocks of video data.

As illustrated in FIG. 9A, the systems and techniques can perform block-based collocated MV projection for each block (e.g., 902a-c) based on a raster scan order applied within each block. For example, to decode a 64×64 block of video data 902a, 64×64 blocks of MVs associated with each collocated reference frame (e.g., REF0, REF1, REF2) can be obtained and projected in the block-level raster scan order depicted in FIG. 9A. The block of REF0 MVs can be projected in raster scan order to generate a REF0 block projection 952, which can be written to or stored in one or more buffers of an MV projection buffer 970. After the block of REF0 MVs 912 has been projected into MV projection buffer 970 (e.g., as REF1 block projection 952), the block of REF1 MVs 914 can be projected in raster scan order to generate a REF1 block projection 954, which can also be written to or stored in one or more buffers of an MV projection buffer 970.

By writing (e.g., projecting) the REF1 block projection 954 to a buffer (e.g., included in MV projection buffer 970) that already includes REF0 block projection 952, the systems and techniques can generate a combined MV field projection for REF1 and REF0, as will be explained in greater depth with respect to FIGS. 10-13. In the combined MV field projection for REF1 and REF0, REF1 MV projections that have the same location as an existing REF0 MV projection will overwrite the existing REF0 MV projection (e.g., as described previously with respect to FIGS. 7A-D).

After the block of REF1 MVs 914 has been projected into MV projection buffer 970 (e.g., as REF1 block projection 954), the block of REF2 MVs 916 can be projected in raster scan order to generate a REF2 block projection 956. REF2 block projection 956 may also be written to or stored in one or more buffers of MV projection buffer 970, overwriting any REF0 and/or REF1 MV projections that exist at the same location as a REF2 MV projection.

In some aspects, the one or more MV buffers included in MV projection buffer 970 can be implemented as a sliding buffer, wherein the currently decoded block of video data is decoded from a first buffer of the sliding MV buffer 970. After decoding the current block (e.g., first block of video data 902a) from the first buffer of the sliding MV buffer 970, the contents of the first buffer can be invalidated (e.g., deleted, cleared, zeroed, etc.). A next block of video data (e.g., second block of video data 902b) can be decoded based on sliding the sliding MV buffer 970 by one step. For example, after the contents of the first buffer are invalidated, the sliding MV buffer 970 can slide one step to the right. In some aspects, the old second buffer becomes the new first buffer from which the next block of video data (e.g., second block of video data 902b) will be decoded; the old third buffer becomes the new second buffer; and the old first buffer (e.g., now empty after having its contents invalidated) becomes the new third buffer.

In one illustrative example, the first buffer of the sliding MV buffer 970 can be used to obtain the MV field projection for decoding the currently decoded block of video data, based on determining that the first buffer includes an MV projection associated with the current block of video data and includes an MV projection for the two horizontally adjacent blocks. For example, when the currently decoded block of video data is block 902a, the first buffer of sliding MV buffer 970 can be used to decode block 902a when the first buffer includes an MV projection associated with block 902a (e.g., the MV projection associated with the current block of video data) and includes an MV projection associated with block 902b (e.g., the MV projection associated with the horizontally adjacent block to the right).

When the currently decoded block of video data is block 902b, the first buffer of sliding MV buffer 970 can be used to decode block 902b when the first buffer includes an MV projection associated with block 902b (e.g., the MV projection associated with the current block of video data), includes an MV projection associated with block 902a (e.g., the MV projection associated with the horizontally adjacent block to the left), and includes an MV projection associated with block 902c (e.g., the MV projection associated with the horizontally adjacent block to the right).

In some aspects, the systems and techniques can be used to perform on-the-fly collocated MV projection based on determining that the first buffer of the sliding MV buffer 970 includes an MV field projection of the current block and the two horizontally adjacent blocks. In such examples, the MV field projection stored in the first buffer of sliding MV buffer 970 can be provided as input to MV prediction unit 960, which generates and writes a final MV to memory 940. Based on the final MV determined using MV prediction unit 960, the current block of video data can be decoded on-the-fly (e.g., before MV projection has been completed for any of the collocated reference frames and/or the currently decoded frame of video data). As will be described in greater depth below with respect to FIG. 10, the current block of video data can be decoded in parallel with performing MV projection for subsequent (e.g., not yet decoded) blocks of video data.

Figure 10:
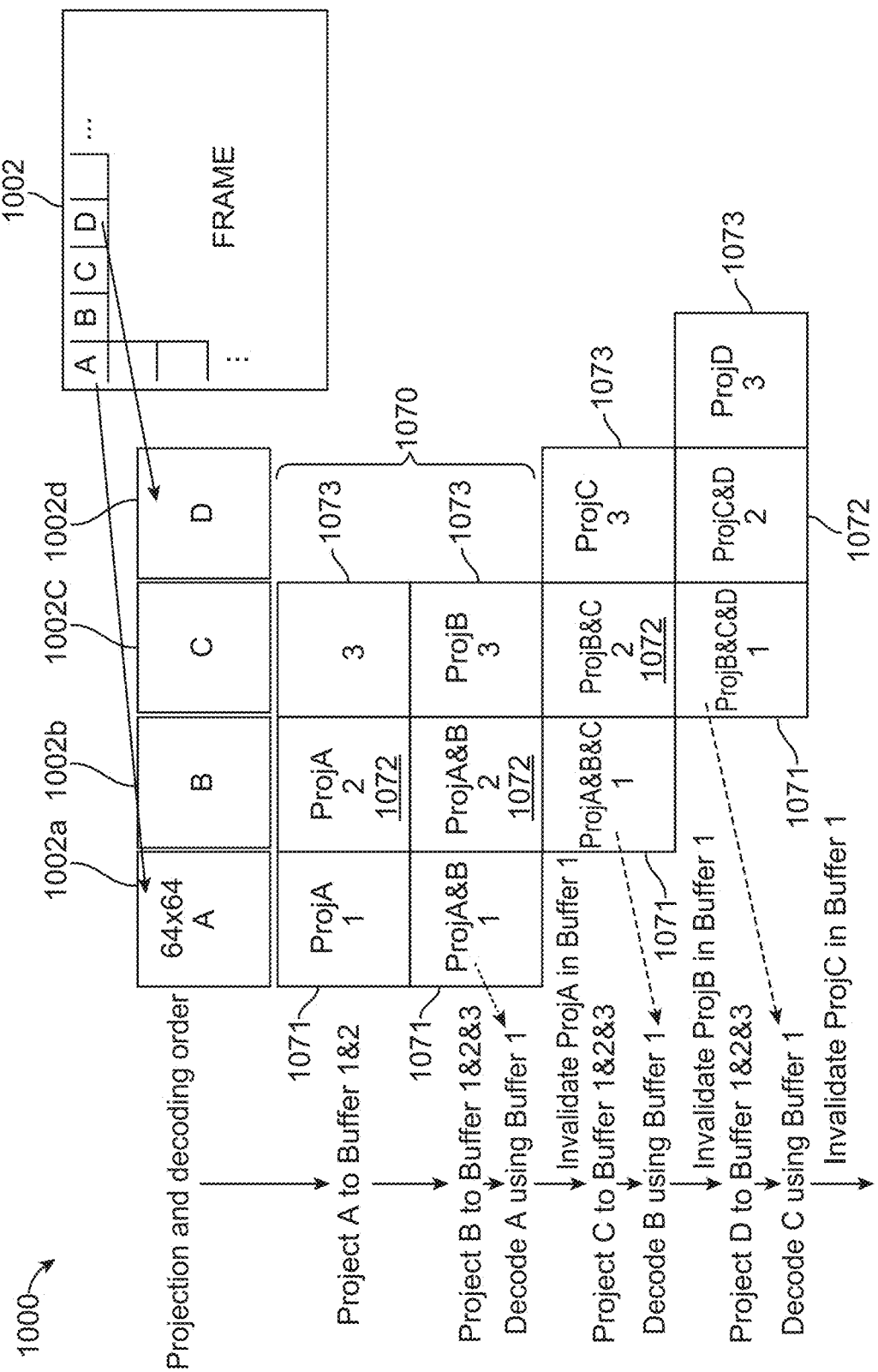
FIG. 10 is a diagram illustrating an example of block-based collocated motion vector projection using a sliding motion vector buffer, in accordance with some examples of the disclosure.

For example, FIG. 10 is a diagram illustrating an example of block-based collocated MV projection using a sliding MV buffer. A currently decoded frame of video data 1002 includes a plurality of blocks of video data, shown here as block A (e.g., block 1002a), block B (e.g., block 1002b), block C (e.g., block 1002c), and block D (e.g., block 1002d). In some examples, the block-level (e.g., block-size) can be 64×64. A sliding MV buffer 1070 includes a first buffer 1071, a second buffer 1072, and a third buffer 1073. In one illustrative example, each buffer 1071-1073 included in sliding MV buffer 1070 can be sized to store one 64×64 block of data. As will be described below, each buffer 1071-1073 can be sized to store one 64×64 block of MV projections.

The plurality of blocks of video data included in the frame of video data 1002 can be processed in a raster order scan over the frame of video data 1002, or various other scan orders. As illustrated in the example of FIG. 10, collocated MV projection can be performed for the frame of video data 1002 using a projection and decoding order of block A, block B, block C, block D, etc. The currently decoded frame of video data 1002 can be associated with one or more collocated reference frames (not shown), as has been described previously. In some examples, the currently decoded frame of video data 1002 can be associated with up to three collocated reference frames.

The block-based collocated MV projection 1000 illustrated in FIG. 10 can apply the same 64×64 block level scan to obtain blocks of MVs from each of the three collocated reference frames associated with the currently decoded frame of video data 1002. For example, the 64×64 block of MVs included within block A of each of the three collocated reference frame (e.g., REF0, REF1, and REF2) can be obtained and projected into sliding MV buffer 1070. In one illustrative example, the three 64×64 block A MVs can be projected into first buffer 1071 and second buffer 1072 of the sliding MV buffer 1070. Because the three buffers 1071-1073 of the sliding MV buffer 1070 each store one 64×64 block of video data, in some aspects, each buffer 1071-1073 can store a different MV projection field.

For example, the block A MVs obtained from REF0 can be projected in raster scan order of block A, with each given block A REF0 MV being projected into either the first buffer (e.g., corresponding to the MV projection field determined for decoding block A video data 1002a) or projected into the second buffer (e.g., corresponding to the MV projection field determined for decoding block B video data 1002b), but not both. For example, as described with respect to FIGS. 6A and 6B, a valid MV projection for a given block can be located either in the same block or in one of the two horizontally adjacent blocks, with an invalid MV projection being located outside of these three blocks. Because block A is the first block for which MV projection is performed, a horizontally adjacent block to the left does not exist, so the only valid MV projection locations for block A are into the first buffer 1071 or into the second buffer 1072.

After the REF0 block A MVs are projected into first buffer 1071 and second buffer 1072, the REF1 block A MVs are obtained and also projected into first buffer 1071 and second buffer 1072. REF1 MV projections that are projected to a location where a REF0 MV projection already exists will overwrite the existing REF0 MV projection (e.g., as described previously with respect to FIGS. 7A-D). Subsequently, after the REF1 block A MV projection has been completed, REF2 block A MVs are obtained and again projected into first buffer 1071 and second buffer 1072, again overwriting any existing REF0 or REF1 projections that already exist at the same location as a REF2 MV projection.

When the REF2 block A MV projection has been completed, the first buffer 1071 includes the MV projections from REF0 block A, REF1 block A, and REF2 block A that were projected to a location within block A. The second buffer 1072 includes the MV projections from REF0 block A, REF1 block A, and REF2 block A that were projected to a location within the horizontally adjacent block to the right of block A (e.g., that were projected into block B). Third buffer 1073 remains empty or otherwise does not include block A projections.

The contents of first buffer 1071 (e.g., the MV projection field of the block A collocated reference frame MVs into block A) cannot yet be used to decode the block A video data 1002a. To decode the block A video data 1002a, the combined MV projection field of the block A collocated reference frames and the block B collocated reference frames into block A is needed.

After MV projection for block A is completed, the MVs included in block B of each of the three collocated reference frames (e.g., REF0, REF1, and REF2) can be obtained and projected into buffers 1071, 1072, and 1073, in a manner that is the same as or similar to that described above with respect to the block A MV projection. When performing MV projection for block B, the REF0, REF1, and REF2 MVs that are projected from block B to block A (e.g., the horizontally adjacent block to the left) are written to first buffer 1071. The REF0, REF1, and REF2 MVs that are projected from block B to another location within block B are written to second buffer 1072. The REF0, REF1, and REF2 MVs that are projected from block B to block C (e.g., the horizontally adjacent block to the right) are written to third buffer 1073.

First buffer 1071 now includes an MV projection field of the three block A reference frame MVs projected into block A and the three block B reference frame MVs projected into block A (e.g., first buffer 1071 includes the MV projection field of block A and block B reference frame MVs into block A). The MV projection field of first buffer 1071 can be used to decode the block A video data 1002*a*.

After decoding the block A video data 1002*a*, the MV projection field of block A (e.g., projection of block A ref frame MVs and block B ref frame MVs into block A) can be invalidated, cleared, zeroed, etc. Sliding MV buffer 1070 can then slide one step to the right, based on reassigning the old second buffer 1072 as the new first buffer 1071. The old third buffer 1073 can be reassigned as the new second buffer 1072, and the old first buffer 1071 (e.g., now empty) can be reassigned as the new third buffer 1073. In one illustrative example, the contents of the buffers included in sliding MV buffer 1070 are not modified during the buffer reassignment. For example, the prior to sliding the sliding MV buffer 1070, the old second buffer 1072 included the projection of block A ref frame MVs into block B and the projection of block B ref frame MVs into block B. After sliding the sliding MV buffer 1070, and reassigning the old second buffer 1072 as the new first buffer 1071, the new first buffer 1071 still includes the same projection of block A ref frame MVs into block B and the projection of block B ref frame MVs into block B.

After sliding the sliding MV buffer 1070 by one step to the right, as described above, the MVs included in block C of each of the three collocated reference frames (e.g., REF0, REF1, and REF2) can be obtained and projected into the buffers 1071, 1072, and 1073. In one illustrative example, because sliding MV buffer 1070 slides one step to the right prior to projecting the block C MVs, the block C MVs are projected into the newly reassigned first buffer 1071 (e.g., the old second buffer 1072 from the previous step), the newly reassigned second buffer 1072 (e.g., the old third buffer 1073 from the previous step), and the newly reassigned third buffer 1073 (e.g., the old first buffer 1071 that was cleared/invalidated in the previous step).

The new first buffer 1071 now contains an MV projection field of the three block A reference frames projected into block B, the three block B reference frames projected into block B, and the three block C reference frames projected into block B (e.g., the new first buffer 1071 includes the combined MV projection field of the three ref frame MVs of block A, the three ref frame MVs of block B, and the three ref frame MVs of block C, all projected into block B). The combined MV projection field of the new first buffer 1071 can be used to decode the block B video data 1002*b*.

After decoding the block B video data 1002*b*, the MV projection field of block B stored in new first buffer 1071 can be invalidated, cleared, zeroed, etc., and the sliding MV buffer 1070 can then slide one step to the right. After the new first buffer 1071 is cleared of the block B MV projection field (e.g., after decoding the block B video data 1002*b*), buffer 1071 can be reassigned as the new third buffer 1073 for decoding the block C video data 1002*c*. The second buffer 1072 can be reassigned as the new first buffer 1071 for decoding the block C video data 1002*c* and the third buffer 1073 can be reassigned as the new second buffer 1072 for decoding the block C video data 1002*c*. The process can then repeat for the block C video data 1002*c*, the block D video data 1002*d*, etc., until all of the blocks included in the plurality of blocks used to divide the frame 1002 have had MV projection performed (e.g., the process described above with respect to decoding blocks A, B, and C using the sliding MV buffer 1070 can be repeated for all of the remaining 64×64 blocks included in the currently decoded frame of video data 1002).

In one illustrative example, the row index of the projected MVs determined for the blocks (e.g., 64×64) of collocated reference frame MV data can be used to modify the overwriting of existing projected MV entries stored in a sliding MV buffer (e.g., sliding MV buffer 1070). For example, the row index of a projected MV that is associated with a same location as an existing projected MV can be compared to the row index of the existing projected MV in order to determine whether overwriting should be performed. In some aspects, the row index-based comparison of projected MVs can be used to obtain a final MV projection field that is generated using the previously described block-level MV projection but implements overwriting of existing MV projections to be the same as if a frame-level raster scan order MV projection was performed.

Figure 14:
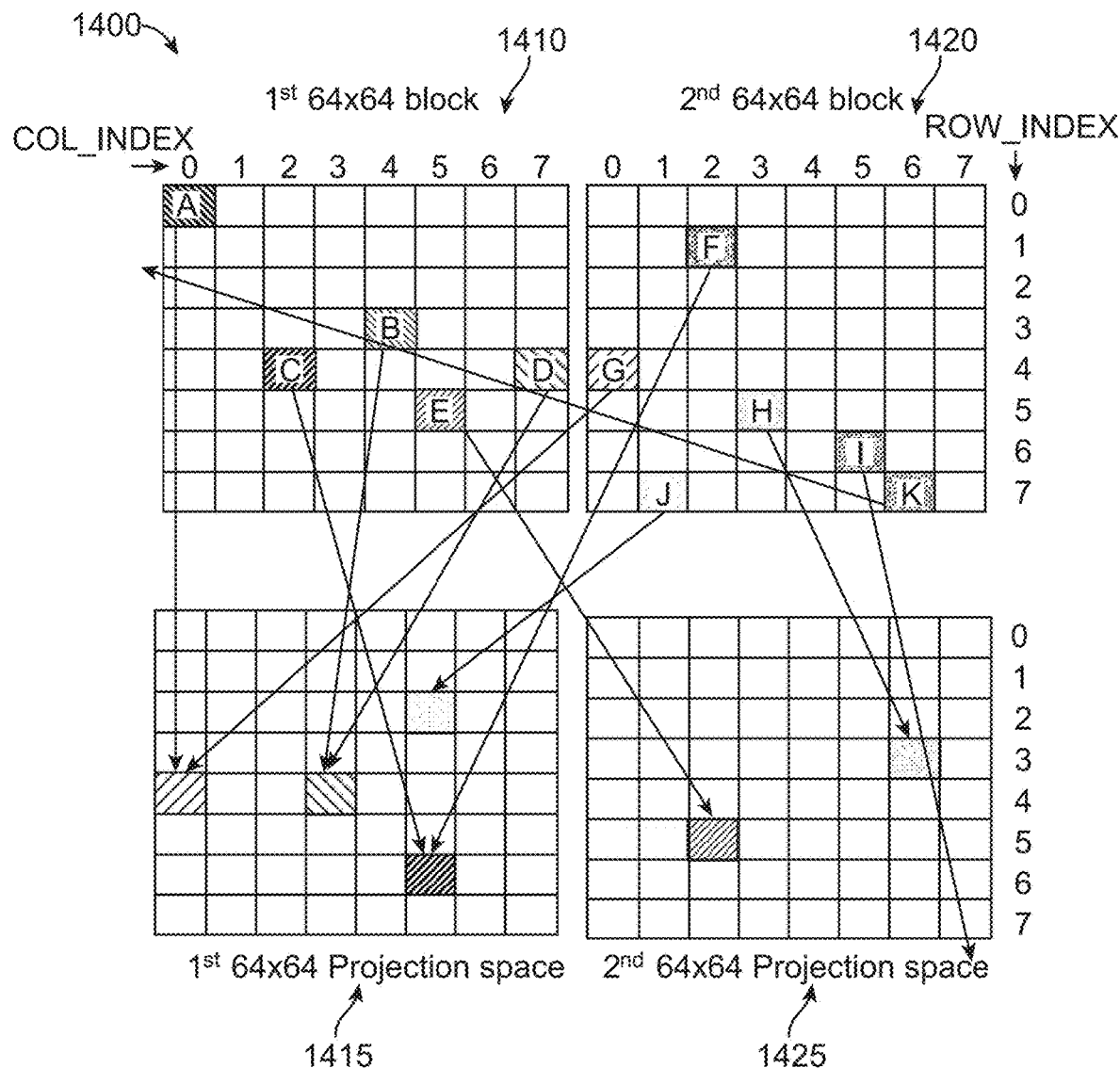
FIG. 14 is a diagram illustrating an example of row-based indexing for overwriting conflicts associated with block-based collocated motion vector projection, in accordance with some examples of the disclosure.

For example, FIG. 14 illustrates an example diagram 1400 of a process that can be used to modify the MV projection overwriting associated with block-level MV projection to be the same as the MV projection overwriting associated with frame-level raster scan order MV projection.

In the existing frame-level raster scan order MV projection (e.g., such as the frame-level raster scan order MV projection described above with respect to FIGS. 8A and 8B), the projection of an MV with a higher row index can always overwrite a previously projected MV with a lower row index. For example, in a frame-level raster scan order approach, an MV with a higher row index (e.g., closer to the bottom of the currently decoded frame) is processed after all MVs with a lower row index (e.g., closer to the top of the currently decoded frame). Therefore, in the frame-level raster scan order approach, MVs with higher row index can always overwrite the previously projected MVs with a lower row index.

However, when a block level MV projection approach is implemented, MVs that are associated with a second block (e.g., horizontally adjacent to the right of a first block) will overwrite previously projected MVs located in the first block, even if the projected MV from the second block is of a lower row index than the previously projected MV located in the first block. For example, FIG. 14 illustrates a first 64×64 block 1410 and a horizontally adjacent second 64×64 block 1420. Also depicted is the associated first 64×64 projection space 1415 and the second 64×64 projection space 1425.

The MVs of the first projection block 1410 are projected first, for example using a raster scan order within first projection block 1410. As illustrated, the MVs A, B, and C may each be projected into the first projection space 1415 without an overwriting conflict. The MV D is projected into the same location within first projection space 1415 as the previously projected MV B, which results in an overwriting conflict that can be evaluated according to the systems and techniques described herein.

Based on the row index of MV D (e.g., row index=4) being greater than the row index of MV B (e.g., row index=3), the projection of MV D can overwrite the existing projection of MV B in first projection space 1415.

MV E can then be projected from first projection block 1410 to the second projection space 1425 without an overwriting conflict. The projection of MV F, from the second projection block 1420 to the first projection space 1415, results in an overwriting conflict because MV F is projected to the same location as the already existing projection of MV C (e.g., the same location with first projection space 1415). In this example, the row index of MV F (e.g., row index=1) is less than the row index of MV C (e.g., row index=4), and the overwriting conflict can be resolved by maintaining the existing projection of MV C (e.g., by preventing MV F from overwriting the existing projection of MV C).

Another overwriting conflict results from the projection of MV G from the second projection block 1620 to the first projection space 1615, as MV G is projected to the same location as the existing projection of MV A. Here, the row index of MV G (e.g., row index=4) is greater than the row index of MV A (e.g., row index=0), and the overwriting conflict is resolved by permitting the projection of MV G to overwrite the existing projection of MV A within the first projection space 1415.

Figure 11:
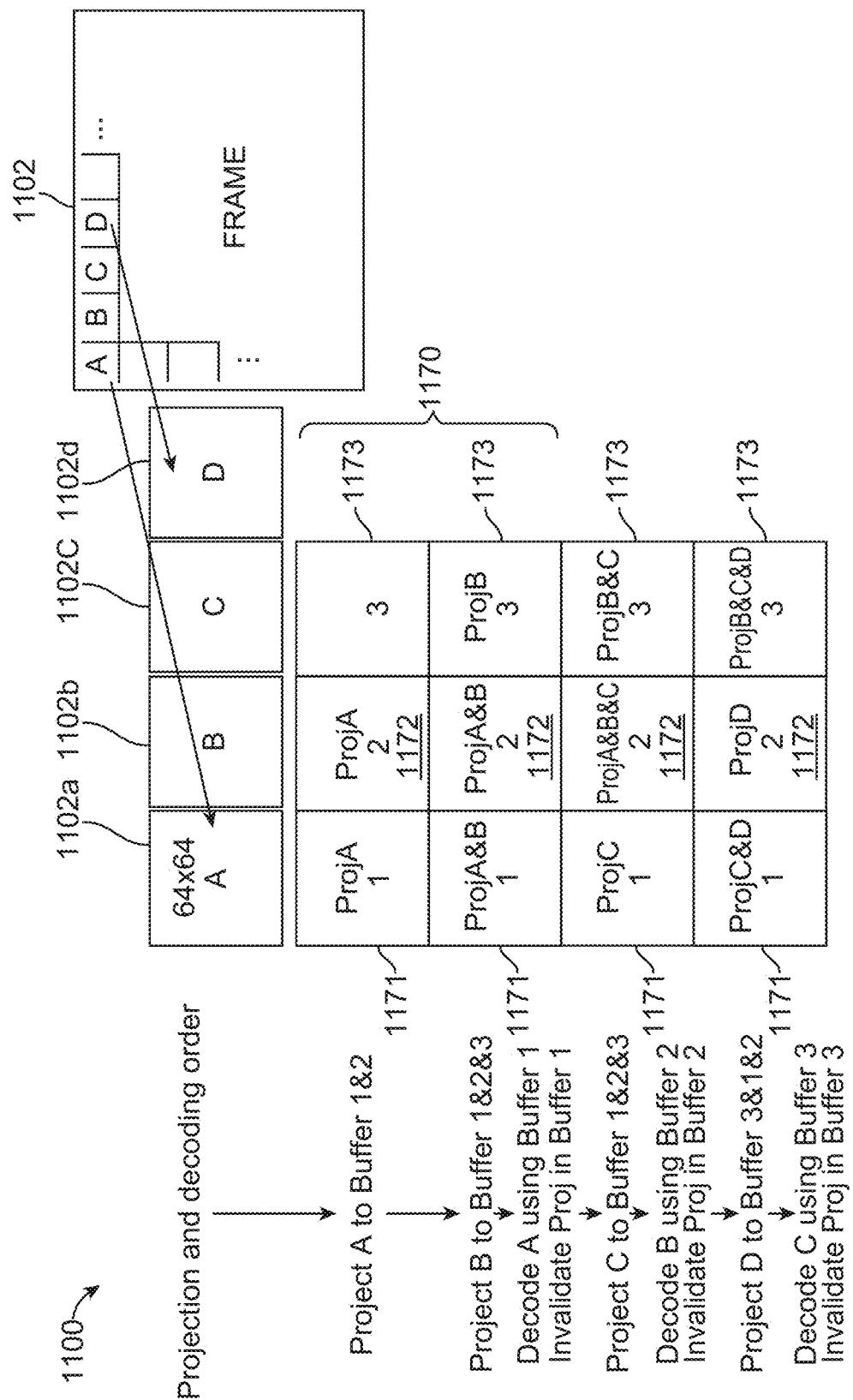
FIG. 11 is a diagram illustrating an example of block-based collocated motion vector projection using a circular motion vector buffer, in accordance with some examples of the disclosure.

In some aspects, the systems and techniques described herein can implement the block-based MV projection buffer as a circular buffer (e.g., rather than the sliding MV buffer 1070 illustrated in FIG. 10). For example, FIG. 11 is a diagram illustrating an example of block-based collocated MV projection 1100 using a circular MV buffer 1170. In this example, the three reference frame MV projections associated with block A (e.g., REF0 block A, REF1 block A, and REF2 block A) can each be projected into the first buffer 1171 and the second buffer 1172 in the same manner as described above with respect to FIG. 10. Similarly, the three reference frame MV projections associated with block B can each be projected into the first buffer 1171, second buffer 1172, and third buffer 1173 in the same manner as described above with respect to FIG. 10.

After the MV projections for blocks A and B have been completed, the block A video data 1102*a* can be decoded using first buffer 1171*a*, again as described above with respect to FIG. 10. However, after decoding the block A video data 1102*a* and invalidating the contents of first buffer 1171*a*, the now empty first buffer 1171*a* is not reassigned as a new third buffer (e.g., the MV buffer 1170 does not slide like the sliding MV buffer 1070). Instead, the MV buffer 1170 can be implemented as a circular buffer.

As illustrated, the three reference frame MV projections associated with block C (e.g., REF0 block C, REF1 block C, and REF2 block C) can each be projected into second buffer 1172, third buffer 1173, and first buffer 1171, in that order. The block B video data 1102*b* can then be decoded from second buffer 1172, and after successful decoding second buffer 1172 can be cleared. The three reference MV projections associated with block D can then be projected into third buffer 1173, first buffer 1171, and second buffer 1172, in that order. The block C video data 1102*c* can then be decoded from third buffer 1173, and after successful decoding third buffer 1173 can be cleared.

Subsequently, three reference frame MV projections associated with an additional block E (e.g., horizontally adjacent to the right of block D, not shown) can each be projected into the first buffer 1171, the second buffer 1172, and the third buffer 1173, in that order. The block D video data 1102*d* can then be decoded from first buffer 1171, and after successful decoding first buffer 1171 can be cleared. The process described above can then repeat for the remaining blocks included in the currently decoded frame 1102. In some aspects, the row index-based overwriting conflict control described above with respect to FIG. 14 may still be utilized with the circular-buffer implementation of block-level collocated MV projection illustrated in FIG. 11.

Figure 12:
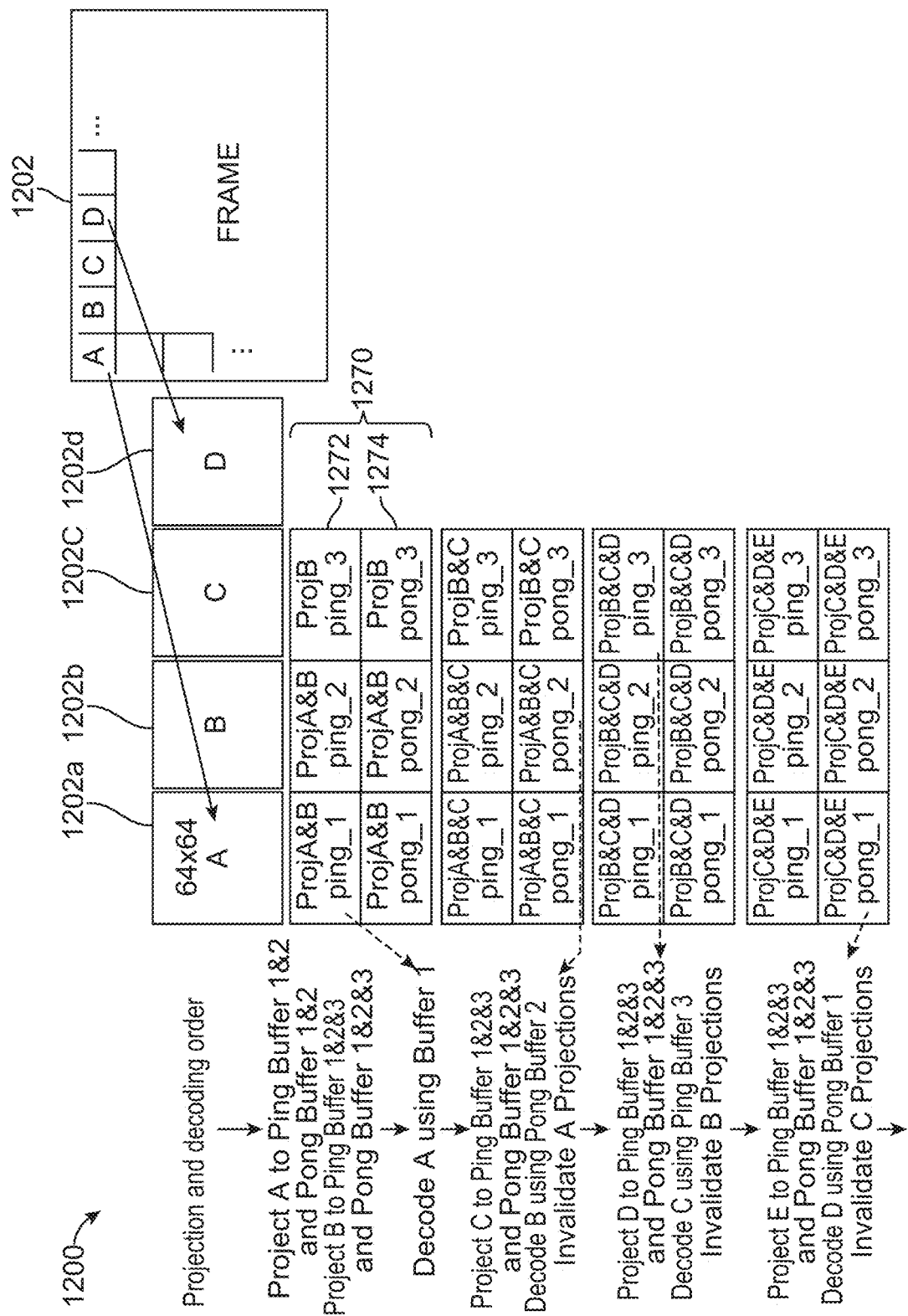
FIG. 12 is a diagram illustrating an example of block-based collocated motion vector projection using a ping-pong motion vector buffer, in accordance with some examples of the disclosure.

In another aspect, the systems and techniques can implement the block-based MV projection buffer using a ping-pong memory buffer. For example, FIG. 12 is a diagram illustrating an example of block-based collocated MV projection 1200 using a ping-pong MV buffer 1270. In this example, the three reference frame MV projections associated with block A (e.g., REF0 block A, REF1 block A, and REF2 block A) can each be projected into the first and second ping buffers, ping_1 and ping_2, respectively, and can additionally each be projected into the first and second pong buffers, pong_1 and pong_2, respectively.

The three reference frame MV projections associated with block B can each be projected into the first, second, and third ping buffers (e.g., ping_1, ping_2, and ping_3, respectively), and can additionally each be projected into the first, second, and third pong buffers (e.g., pong_1, pong_2, and pong_3, respectively). The block A video data 1202*a* can be decoded from the ping_1 buffer.

Subsequently, the three reference frame MV projections associated with block C can each be projected into the first, second, and third ping buffers (e.g., ping_1, ping_2, and ping_3, respectively), and can additionally each be projected into the first, second, and third pong buffers (e.g., pong_1, pong_2, and pong_3, respectively). The block B video data 1202*b* can be decoded from the pong_2 buffer. After decoding the block B video data 1202*b*, the block A projections can be invalidated (e.g., cleared) from all buffers of MV buffer 1270 (e.g., can be invalidated from all ping buffer and all pong buffers).

The three reference frame MV projections associated with block D can then each be projected into the first, second, and third ping buffers (e.g., ping_1, ping_2, and ping_3, respectively), and can additionally each be projected into the first, second, and third pong buffers (e.g., pong_1, pong_2, and pong_3, respectively). The block C video data 1202*c* can be decoded from the ping_3 buffer. After decoding the block C video data 1202*c*, the block B projections can be invalidated (e.g., cleared) from all buffers of MV buffer 1270 (e.g., can be invalidated from all ping buffer and all pong buffers).

The three reference frame MV projections associated with an additional block E (e.g., horizontally adjacent to the right of block D, not shown) can then each be projected into the first, second, and third ping buffers (e.g., ping_1, ping_2, and ping_3, respectively), and can additionally each be projected into the first, second, and third pong buffers (e.g., pong_1, pong_2, and pong_3, respectively). The block D video data 1202*d* can be decoded from the pong_1 buffer. After decoding the block D video data 1202*d*, the block D projections can be invalidated (e.g., cleared) from all buffers of MV buffer 1270 (e.g., can be invalidated from all ping buffer and all pong buffers).

The process described above can then repeat for the remaining blocks included in the currently decoded frame 1202. In some aspects, the row index-based overwriting conflict control described above with respect to FIG. 14 may still be utilized with the ping pong MV buffer implementation of block-level collocated MV projection illustrated in FIG. 12.

In another aspect, the systems and techniques can implement the block-based MV projection described herein using a block-level scan size of 128×128 (e.g., as opposed to the 64×64 block size described above). For example, as illustrated in the example diagram 1300 of FIG. 13, a frame of currently decoded video data 1302 can be divided into a plurality of 128×128 blocks. Each 128×128 block of video data can include four 64×64 sub-blocks. For example, the frame A video data 1302a can include sub-blocks A1, A2, A3, and A4, each 64×64 in size.

The three reference frame MV projections associated with the frame A video data 1302a can be read at the 128×128 size. The 64×64 A1 and A2 portions of the frame A MVs can be projected into the buffers Up_1, Low_1, respectively, and can be projected into the buffers Up_2, Low_2, respectively. The 64×64 A3 and A4 portions of the frame A MVs can be projected into the buffers Up_1, Low_1, respectively; can be projected into the buffers Up_2, Low_2, respectively; and can be projected into the buffers Up_3, Low_3, respectively.

The three reference frame MV projections associated with the frame B video data 1302b can be read at the 128×128 size. The 64×64 B1 and B2 portions of the frame B MVs can be projected into the buffers Up_2, Low_2, respectively; can be projected into the buffers Up_3, Low_3, respectively; and can be projected into the buffers Up_4, Low_4, respectively.

The block A video data 1302a can subsequently be decoded using the first and second buffers (e.g., Up_1, Up_2, Low_1, Low_2). In some aspects, the projection of the 64×64 portions of the 128×128 blocks of video data (e.g., frame A video data 1302a, frame B video data 1302b, etc.) can be performed in inverse-N order, and the decoding of the 64×64 portions of the 128×128 blocks of video data can be performed in Z-order. In some cases, performing inverse-N order collocated motion vector projection (e.g., the projection of 64×64 portions or the projection of two 64×128 portions split from a 128×128 block of video data) can be associated with a 50% reduction in DDR or other memory bandwidth at the vertical tile boundaries. For example, for a 128×128 block of video data, at vertical tile boundaries the left line buffer read may be 64. In some examples, the A1-A4 64×64 sub-blocks of the block A video data 1302a can be decoded in Z-order beginning with A1, followed by A3, A2, and A4.

After decoding the four 64×64 sub-blocks of the 128×128 block A video data 1302a, buffers 1 and 2 can be invalidated, cleared, zeroed, etc. For example, the buffers Up_1, Up_2, Low_1, and Low_2 can be invalidated. Subsequently, the 64×64 sub-blocks B3, B4 and C1, C3 can be projected into the high and low buffers of buffers 1 through 4, with the old buffers 3 and 4 being reassigned as the new buffers 1 and 2. The old buffers 1 and 2 (now cleared) can be assigned as the new buffers 3 and 4, implementing a sliding buffer in a manner the same as or similar to that described above with respect to FIG. 10.

Figure 15:
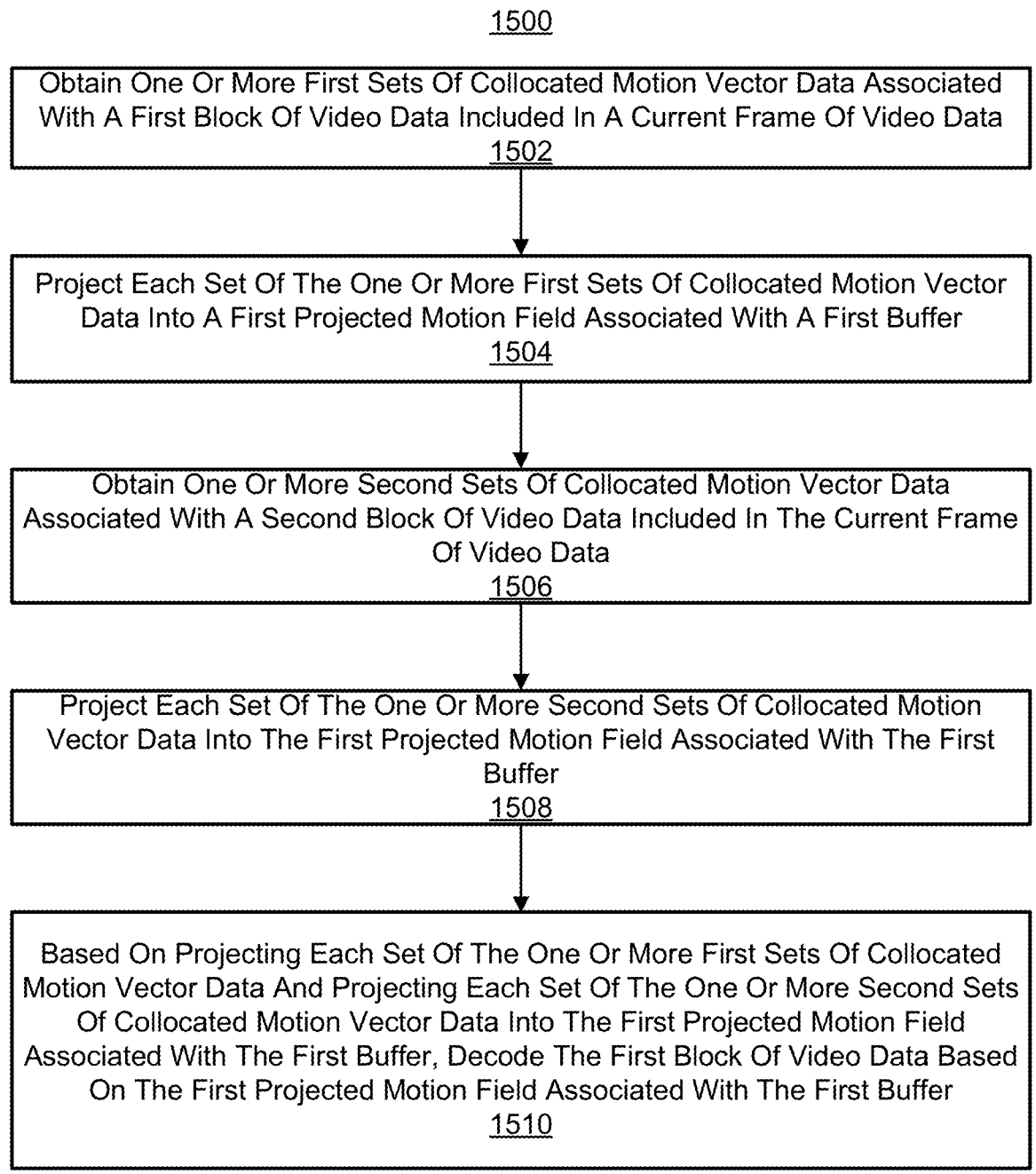
FIG. 15 is a flowchart illustrating an example process for video coding using block-based collocated motion vector projection, in accordance with some examples of the disclosure.

FIG. 15 is a flowchart diagram illustrating an example of a process 1500 encoding or decoding (coding) video data according to aspects described herein. At block 1502, the process 1500 includes obtaining one or more first sets of collocated motion vector data associated with a first block of video data included in a current frame of video data. For example, the first block of video data can be the same as or similar to the current block 422 illustrated in FIG. 4B, one or more of the blocks 1002a-1002d illustrated in FIG. 10, one or more of the blocks 1102a-1102d illustrated in FIG. 11, one or more of the blocks 1202a-1202d illustrated in FIG. 12, and/or one or more of the blocks 1302a-1302d illustrated in FIG. 13. In some cases, the current frame of video data can be the same as or similar to the current picture 510 illustrated in FIG. 5, the current frame 622 illustrated in FIG. 6A, the frame 1002 illustrated in FIG. 10, the frame 1102 illustrated in FIG. 11, the frame 1202 illustrated in FIG. 12, and/or the frame 1302 illustrated in FIG. 13.

In some examples, the one or more first sets of collocated motion vector data comprise three first sets of collocated motion vector data obtained from three respective reference frames associated with the current frame of video data. For example, the one or more first sets of collocated motion vector data can include one or more of the Frame0 MVs 812, Frame1 MVs 814, and Frame2 MVs 816 illustrated in FIG. 8A and/or the Frame0 MVs 912, Frame1 MVs 914, and Frame2 MVs 916 illustrated in FIG. 9A. In some examples, the three first set of collocated motion vector data can be obtained from three respective reference frames selected from among the various types of reference frames 630 illustrated in FIG. 6B (e.g., three respective reference frames can be obtained for each of the Frame0 MVs 812/912, three respective reference frames can be obtained for each of the Frame1 MVs 814/914, and three respective reference frames be obtained for each of the Frame2 MVs 816/916).

In some cases, a location of the three first sets of collocated motion vector data within the respective three reference frames is the same. The location of the three first sets of collocated motion vector data within the respective three reference frames can be the same as a location of the first block of video data within the current frame of video data. In some examples, the first block of video data can be a 64×64 block of video data, a 64×128 block of video data, a 128×64 block of video data, a 128×128 block of video data, etc. In some cases, the one or more first sets of collocated motion vector data (e.g., the three first sets of collocated motion vector data) can have a same size as the first block of video data.

Figure 9B:
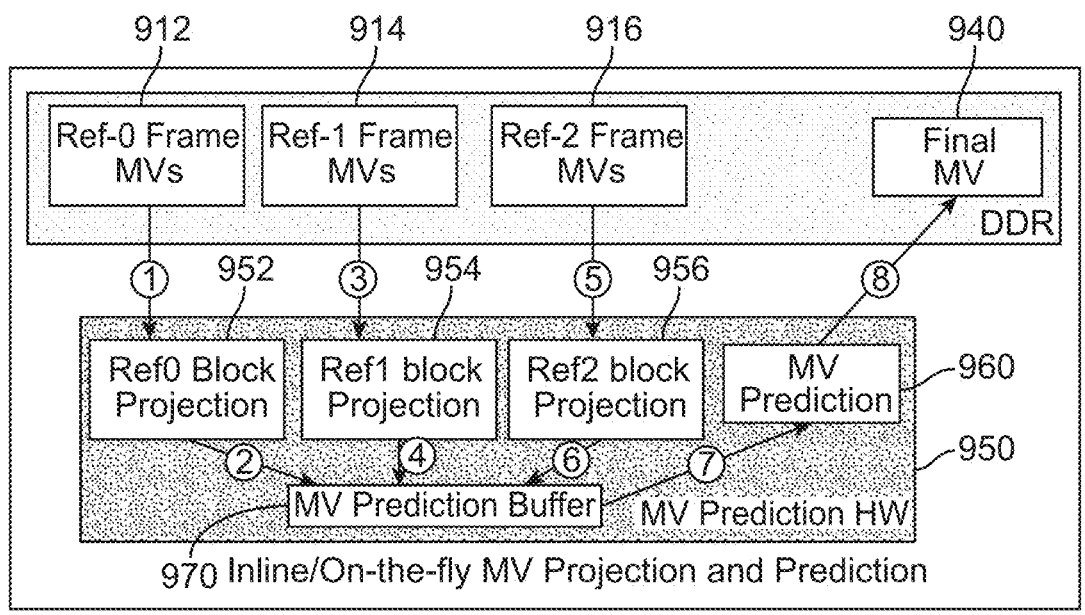
FIG. 9B illustrates an example diagram of a system for performing collocated motion vector projection based on a block-level processing, in accordance with some examples of the disclosure.

At block 1504, the process 1500 includes projecting each set of the one or more first sets of collocated motion vector data into a first projected motion field associated with a first buffer. For example, each set of the one or more first sets of collocated motion vector data can be projected into a first projected motion field associated with the motion vector prediction buffer 970 illustrated in FIG. 9B. In some cases, where the one or more first sets of collocated motion vector data are the same as or similar to the Ref-0 Frame MVs 912 illustrated in FIGS. 9A and 9B, the first projected motion field can be the same as or similar to the Ref0 Block projection 952 illustrated in FIG. 9B.

In some examples, where the one or more first sets of collocated motion vector data are associated with the first block given by block 1002a illustrated in FIG. 10, the first projected motion field can be the same as or similar to the projection 1071. In some cases, where the one or more first sets of collocated motion vector data are associated with the first block given by block 1102a illustrated in FIG. 11, the first projected motion field can be the same as or similar to the projection 1171. In some examples, where the one or more first sets of collocated motion vector data are associated with the first block given by block 1202a illustrated in FIG. 12, the first projected motion field can be the same as or similar to one or more of the projections 1270; etc.

Figure 13:
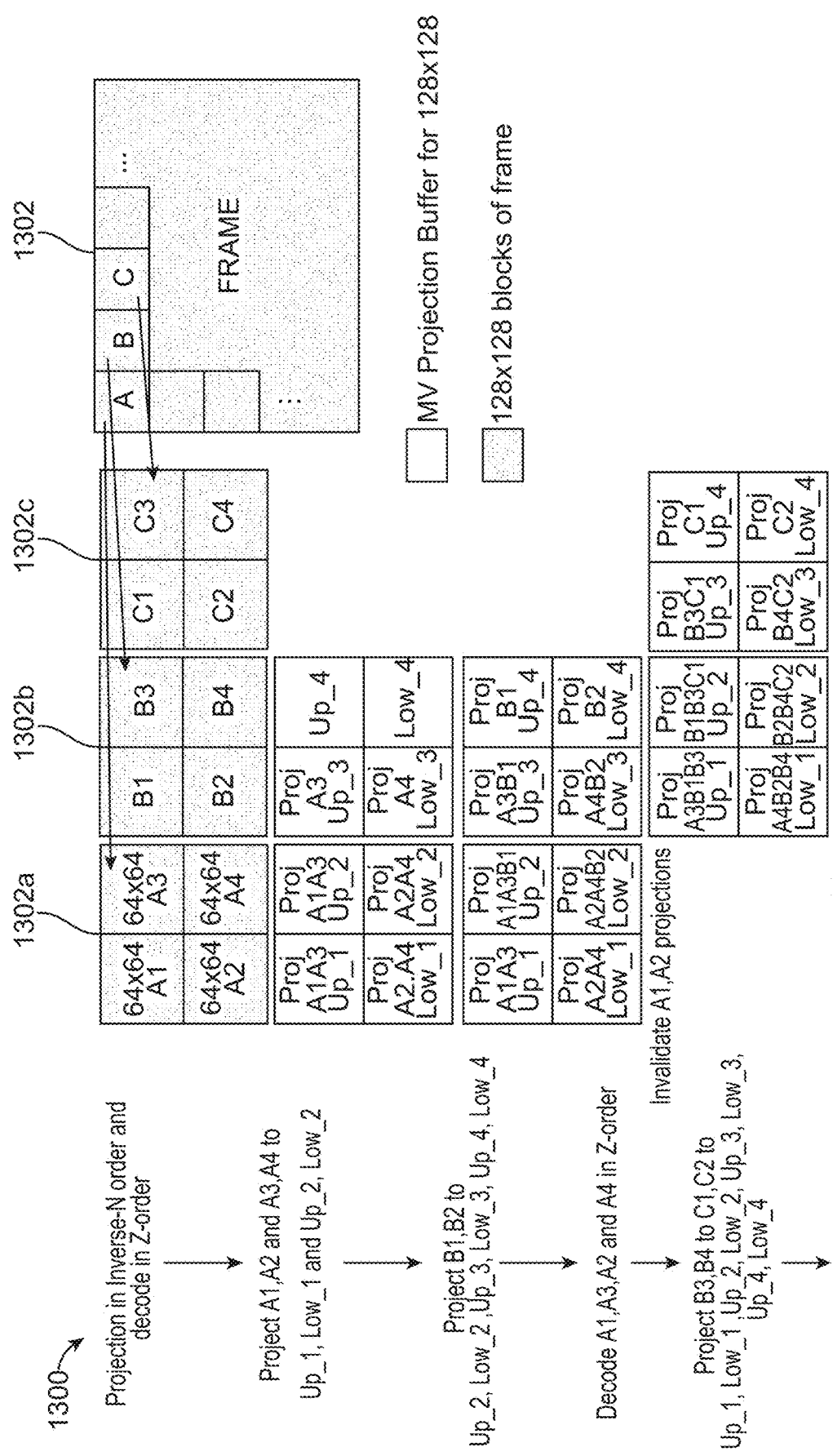
FIG. 13 is a diagram illustrating an example of block-based collocated motion vector projection using a sliding motion vector buffer with projection in inverse-N order and decoding in Z-order, in accordance with some examples of the disclosure.

In some examples, projecting each set of the one or more first sets of collocated motion vector data comprises splitting each set of the one or more first sets of collocated motion vector data into a first 64×128 set of collocated motion vector data and a second set of 64×128 collocated motion vector data (e.g., when the first block size and the collocated motion vector data size is 128×128). In some cases, the first and second 64×128 sets of collocated motion vector data can be non-overlapping. In some aspects, the first 64×128 set of collocated motion vector data and the second 64×128 set of collocated motion vector data can be projected in inverse-N order, for example as illustrated in FIG. 13.

At block 1506, the process 1500 includes obtaining one or more second sets of collocated motion vector data associated with a second block of video data included in the current frame of video data. For example, the second block of video data can be the same as or similar to one or more of the blocks 1002a-1002d illustrated in FIG. 10, one or more of the blocks 1102a-1102d illustrated in FIG. 11, one or more of the blocks 1202a-1202d illustrated in FIG. 12, and/or one or more of the blocks 1302a-1302d illustrated in FIG. 13.

In some cases, the second block of video data can be adjacent to the first block of video data. For example, the first block of video data can be block 1002a, illustrated in FIG. 10, and the second block of video data can be block 1002b; the first block of video data can be block 1102a, illustrated in FIG. 11, and the second block of video data can be block 1102b; etc. In some examples, the first block of video data can be block 1002b, illustrated in FIG. 10, and the second block of video data can be block 1002c; the first block of video data can be block 1102b, illustrated in FIG. 11, and the second block of video data can be block 1002c; etc.

In some examples, the one or more second sets of collocated motion vector data comprise three second sets of collocated motion vector data obtained from the three respective reference frames associated with the current frame of video data. For example, the three second sets of collocated motion vector data and the three first sets of collocated motion vector data can be obtained from the same three respective reference frames (e.g., the same three respective reference frames described above with respect to block 1502 of process 1500).

In some cases, a location of the three second sets of collocated motion vector data within the respective three reference frames is the same. The location of the three second sets of collocated motion vector data within the respective three reference frames can be the same as a location of the second block of video data within the current frame of video data. In some examples, the second block of video data can be a 64×64 block of video data, a 64×128 block of video data, a 128×64 block of video data, a 128×128 block of video data, etc. In some cases, the one or more second sets of collocated motion vector data (e.g., the three second sets of collocated motion vector data) can have a same size as the second block of video data.

In some examples, the first block of video data and the second block of video data can have a same size. The one or more first sets of collocated motion vector data can have a same size as the one or more second sets of collocated motion vector data (e.g., both of which can additionally, or alternatively, be the same size as the first and second blocks of video data).

At block 1508, the process 1500 includes projecting each set of the one or more second sets of collocated motion vector data into the first projected motion field associated with the first buffer. For example, each set of the one or more second sets of collocated motion vector data can be projected into the first projected motion field associated with the motion vector prediction buffer 970 illustrated in FIG. 9B. In some aspects, each set of the one or more second sets of collocated motion vector data can be projected into the same first projected motion field into which each set of the one or more first sets of collocated motion vector data was projected (e.g., as described above with respect to block 1504 of process 1500). In some cases, where the one or more first sets of collocated motion vector data are the same as or similar to the Ref-0 Frame MVs 912 illustrated in FIGS. 9A and 9B, the one or more second sets of collocated motion vector data can be the same as or similar to the Ref-1 Frame MVs 914 illustrated in FIGS. 9A and 9B.

In some examples, where the one or more first sets of collocated motion vector data are associated with the first block given by block 1002a illustrated in FIG. 10, the one or more second sets of collocated motion vector data may be associated with the second block given by block 1002b illustrated in FIG. 10. As described previously, the first projected motion field can be the same as or similar to the projection 1071. At block 1504, the collocated MVs associated with block 1002a can be projected into the first projected motion field 1071 (e.g., yielding the 'ProjA' illustrated in FIG. 10). At block 1508, the collocated MVs associated with block 1002b can be projected on top of the existing projection of first projected motion field 1071 (e.g., yielding the 'Proj A&B' illustrated in FIG. 10).

At block 1510, the process 1500 includes based on projecting each set of the one or more first sets of collocated motion vector data and projecting each set of the one or more second sets of collocated motion vector data into the first projected motion field associated with the first buffer, decoding the first block of video data based on the first projected motion field associated with the first buffer. For example, the block 1002a illustrated in FIG. 10 can be decoded based on projecting the collocated MV data associated with block 1002a into the buffer 1071 and projecting the collocated MV data associated with block 1002b into the buffer 1071, wherein the projections of the collocated MV data associated with block 1002b overwrite conflicting projections of the collocated MV data associated with block 1002a (e.g., overwrite projections at the same location within the first projected motion field).

In some examples, the process 1500 may further include projecting each of the one or more first sets of collocated motion vector data into a second projected motion field associated with a second buffer, wherein the second projected motion field is associated with decoding the second block of video data. For example, the collocated MV data associated with block 1002a can be projected into a second projected motion field associated with a second buffer 1072, as illustrated in FIG. 10; the collocated MV data associated with block 1102a can be projected into a second projected motion field associated with a second buffer 1172, as illustrated in FIG. 11; etc.

In some cases, the process 1500 may further include projecting each of the one or more second sets of collocated motion vector data into the second projected motion field associated with the second buffer and projecting each of the one or more second sets of collocated motion vector data into a third projected motion field associated with a third buffer, wherein the third projected motion field is associated with decoding a third block of video data located adjacent to the second block of video data. For example, the collocated MV data associated with block 1002b can be projected into the second projected motion field associated with second buffer 1072 and can be projected into the third projected motion field associated with third buffer 1073, illustrated in FIG. 10; the collocated MV data associated with block 1102*b* can be projected into the second projected motion field associated with second buffer 1172 and can be projected into the third projected motion field associated with third buffer 1173, illustrated in FIG. 11; etc. In the example above, the third block of video data can be located adjacent to the second block of video data (e.g., the third block of video data can be the same as or similar to block 1002*c* illustrated in FIG. 10; block 1102*c* illustrated in FIG. 11; etc.).

In some examples, the process 1500 can include obtaining one or more third sets of collocated motion vector data associated with the third block of video data included in the current frame of video data and projecting each of the one or more third sets of collocated motion vector data into the second projected motion field associated with the second buffer. For example, collocated MV data associated with third block 1002*c* illustrated in FIG. 10 can be obtained and projected into the second projected motion field associated with second buffer 1072; collocated MV data associated with third block 1102*c* illustrated in FIG. 11 can be obtained and projected into the second projected motion field associated with second buffer 1172; etc. In some examples, the second block of video data can be decoded based on the second projected motion field associated with the second buffer, after the collocated MVs associated with the first, second, and third blocks have been projected into the second projected motion field associated with the second buffer. For example, the second block 1002*b* illustrated in FIG. 10 can be decoded after the collocated MVs associated with first block 1002*a*, second block 1002*b*, and third block 1002*c* have each been projected into the second projected motion field associated with second buffer 1072; the second block 1102*b* illustrated in FIG. 11 can be decoded after the collocated MVs associated with first block 1102*a*, second block 1102*b*, and third block 1102*c* have each been projected into the second projected motion field associated with second buffer 1172; etc.

In some examples, the process 1500 can further include projecting each of the one or more third sets of collocated motion vector data into the third projected motion field associated with the third buffer and deleting the first projected motion field from the first buffer based on successfully decoding the first block of video data. For example, collocated MV data associated with third block 1002*c* illustrated in FIG. 10 can be projected into a third projected motion field associated with third buffer 1073, and the first projected motion field stored in first buffer 1071 can be cleared or deleted based on successfully decoding the first block 1002*a* (e.g., based on the earlier projection of first block 1002*a* and second block 1002*b* into first buffer 1071, as described above). In some examples, the process 1500 can further include projecting each of the one or more third sets of collocated motion vector data into a fourth projected motion field, wherein the fourth projected motion field is written to the first buffer. For example, after deleting the contents of first buffer 1071 illustrated in FIG. 10, first buffer 1071 can be utilized to store the fourth projected motion field. In some examples, the process 1500 can further include deleting the second projected motion field from the second buffer based on successfully decoding the second block of video data. In some cases, the first buffer, the second buffer, and the third buffer can be included in a sliding buffer. In some examples, the first buffer, the second buffer, and the third buffer can be included in a circular buffer or a ping pong memory.

In some implementations, the processes (or methods) described herein (including process 1500) can be performed by a computing device or an apparatus, such as the system 100 shown in FIG. 1. For example, the processes can be performed by the encoding device 104 shown in FIG. 1 and FIG. 16, by another video source-side device or video transmission device, by the decoding device 112 shown in FIG. 1 and FIG. 17, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of process 1500.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The data connection may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various aspects of the application have been described.

Figure 16:
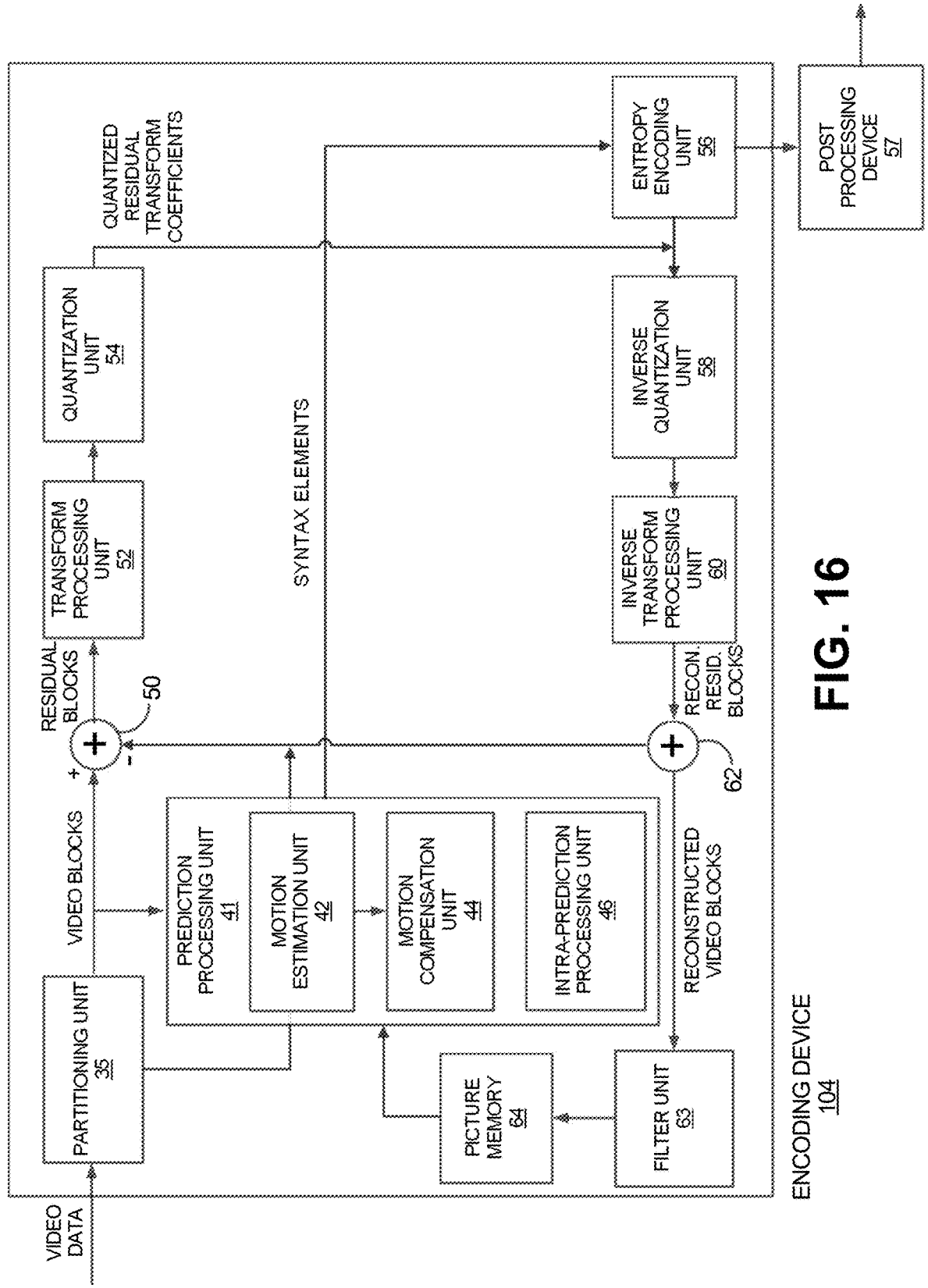
FIG. 16 is a block diagram illustrating an example video encoding device, in accordance with some examples of the disclosure.
Figure 17:
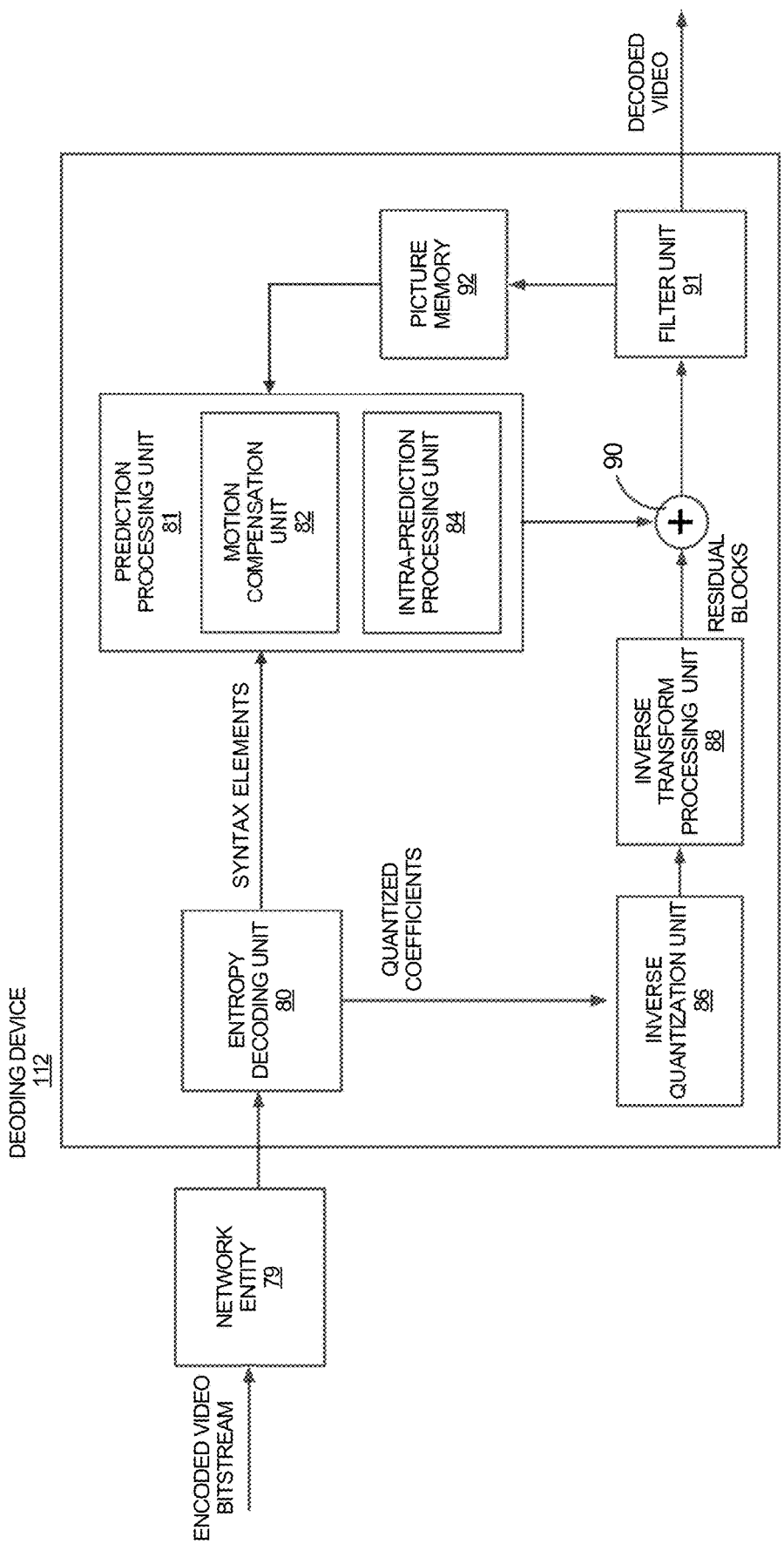
FIG. 17 is a block diagram illustrating an example video decoding device, in accordance with some examples of the disclosure.

Specific details of the encoding device 104 and the decoding device 112 are shown in FIGS. 16 and 17, respectively. FIG. 16 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 16 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 16, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform the subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 16 represents an example of a video encoder configured to perform any of the techniques described herein, including the process described above with respect to FIG. 15. In some cases, some of the techniques of this disclosure may also be implemented by post processing device 57.

FIG. 17 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 16.

During the decoding process, the decoding device 112 receives an encoded video bitstream that represents video blocks of an encoded video slice and associated syntax elements sent by the encoding device 104. In some aspects, the decoding device 112 may receive the encoded video bitstream from the encoding device 104. In some aspects, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform the summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 17 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 17 represents an example of a video decoder configured to perform any of the techniques described herein, including the process described above with respect to FIG. 15.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the various aspects of the disclosure in unnecessary detail. In other instances, well-known circuits, processes, algorithms, structures, and techniques may be shown without unnecessary detail in order to avoid obscuring the various aspects of the disclosure.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects of the disclosure can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing video data, comprising: at least one memory; and at least one processor coupled to the at least one memory, the at least one processor configured to: obtain one or more first sets of collocated motion vector data associated with a first block of video data included in a current frame of video data; project each set of the one or more first sets of collocated motion vector data into a first projected motion field associated with a first buffer; obtain one or more second sets of collocated motion vector data associated with a second block of video data included in the current frame of video data; project each set of the one or more second sets of collocated motion vector data into the first projected motion field associated with the first buffer; and based on projecting each set of the one or more first sets of collocated motion vector data and projecting each set of the one or more second sets of collocated motion vector data into the first projected motion field associated with the first buffer, decode the first block of video data based on the first projected motion field associated with the first buffer.

Aspect 2: The apparatus of Aspect 1, wherein the at least one processor is further configured to: project each of the one or more first sets of collocated motion vector data into a second projected motion field associated with a second buffer, wherein the second projected motion field is associated with decoding the second block of video data.

Aspect 3: The apparatus of Aspect 2, wherein the second block of video data is adjacent to the first block of video data.

Aspect 4: The apparatus of any of Aspects 2 to 3, wherein the at least one processor is further configured to: project each of the one or more second sets of collocated motion vector data into the second projected motion field associated with the second buffer; and project each of the one or more second sets of collocated motion vector data into a third projected motion field associated with a third buffer, wherein the third projected motion field is associated with decoding a third block of video data located adjacent to the second block of video data.

Aspect 5: The apparatus of Aspect 4, wherein the at least one processor is further configured to: obtain one or more third sets of collocated motion vector data associated with the third block of video data included in the current frame of video data; project each of the one or more third sets of collocated motion vector data into the second projected motion field associated with the second buffer; and decode the second block of video data based on the second projected motion field associated with the second buffer.

Aspect 6: The apparatus of Aspect 5, wherein the at least one processor is further configured to: project each of the one or more third sets of collocated motion vector data into the third projected motion field associated with the third buffer; delete the first projected motion field from the first buffer based on successfully decoding the first block of video data; and project each of the one or more third sets of collocated motion vector data into a fourth projected motion field, wherein the fourth projected motion field is written to the first buffer.

Aspect 7: The apparatus of any of Aspects 5 to 6, wherein the at least one processor is further configured to: delete the second projected motion field from the second buffer based on successfully decoding the second block of video data.

Aspect 8: The apparatus of any of Aspects 6 to 7, wherein the first buffer, the second buffer, and the third buffer are included in a sliding buffer.

Aspect 9: The apparatus of any of Aspects 6 to 8, wherein the first buffer, the second buffer, and the third buffer are included in a circular buffer or a ping pong memory.

Aspect 10: The apparatus of any of Aspects 1 to 9, wherein: the one or more first sets of collocated motion vector data comprise three first sets of collocated motion vector data obtained from three respective reference frames associated with the current frame of video data; and the one or more second sets of collocated motion vector data comprise three second sets of collocated motion vector data obtained from the three respective reference frames associated with the current frame of video data.

Aspect 11: The apparatus of Aspect 10, wherein: a location of the three first sets of collocated motion vector data within the respective three reference frames is the same; and the location of the three first sets of collocated motion vector data within the respective three reference frames is the same as a location of the first block of video data within the current frame of video data.

Aspect 12: The apparatus of any of Aspects 10 to 11, wherein: a location of the three second sets of collocated motion vector data within the respective three reference frames is the same; and the location of the three second sets of collocated motion vector data within the respective three references frames is the same as a location of the second block of video data within the current frame of video data.

Aspect 13: The apparatus of any of Aspects 1 to 12, wherein: the first block of video data is a 128×128 block of video data; and the one or more first sets of collocated motion vector data have a same size as the first block of video data.

Aspect 14: The apparatus of Aspect 13, wherein to project each set of the one or more first sets of collocated motion vector data, the at least one processor is configured to: split each set of the one or more first sets of collocated motion vector data into a first 64×128 set of collocated motion vector data and a second 64×128 set of collocated motion vector data; and project the first 64×128 set and the second 64×128 set in inverse-N order.

Aspect 15: The apparatus of Aspect 14, wherein the first 64×128 set and the second 64×128 set are non-overlapping.

Aspect 16: A method for processing video data, comprising: obtaining one or more first sets of collocated motion vector data associated with a first block of video data included in a current frame of video data; projecting each set of the one or more first sets of collocated motion vector data into a first projected motion field associated with a first buffer; obtaining one or more second sets of collocated motion vector data associated with a second block of video data included in the current frame of video data; projecting each set of the one or more second sets of collocated motion vector data into the first projected motion field associated with the first buffer; and based on projecting each set of the one or more first sets of collocated motion vector data and projecting each set of the one or more second sets of collocated motion vector data into the first projected motion field associated with the first buffer, decoding the first block of video data based on the first projected motion field associated with the first buffer.

Aspect 17: The method of Aspect 16, further comprising: projecting each of the one or more first sets of collocated motion vector data into a second projected motion field associated with a second buffer, wherein the second projected motion field is associated with decoding the second block of video data.

Aspect 18: The method of Aspect 17, wherein the second block of video data is adjacent to the first block of video data.

Aspect 19: The method of any of Aspects 17 to 18, further comprising: projecting each of the one or more second sets of collocated motion vector data into the second projected motion field associated with the second buffer; and projecting each of the one or more second sets of collocated motion vector data into a third projected motion field associated with a third buffer, wherein the third projected motion field is associated with decoding a third block of video data located adjacent to the second block of video data.

Aspect 20: The method of Aspect 19, further comprising: obtaining one or more third sets of collocated motion vector data associated with the third block of video data included in the current frame of video data; projecting each of the one or more third sets of collocated motion vector data into the second projected motion field associated with the second buffer; and decoding the second block of video data based on the second projected motion field associated with the second buffer.

Aspect 21: The method of Aspect 20, further comprising: projecting each of the one or more third sets of collocated motion vector data into the third projected motion field associated with the third buffer; deleting the first projected motion field from the first buffer based on successfully decoding the first block of video data; and projecting each of the one or more third sets of collocated motion vector data into a fourth projected motion field, wherein the fourth projected motion field is written to the first buffer.

Aspect 22: The method of any of Aspects 20 to 21, further comprising: deleting the second projected motion field from the second buffer based on successfully decoding the second block of video data.

Aspect 23: The method of any of Aspects 21 to 22, wherein the first buffer, the second buffer, and the third buffer are included in a sliding buffer.

Aspect 24: The method of any of Aspects 21 to 23, wherein the first buffer, the second buffer, and the third buffer are included in a circular buffer or a ping pong memory.

Aspect 25: The method of any of Aspects 16 to 24, wherein: the one or more first sets of collocated motion vector data comprise three first sets of collocated motion vector data obtained from three respective reference frames associated with the current frame of video data; and the one or more second sets of collocated motion vector data comprise three second sets of collocated motion vector data obtained from the three respective reference frames associated with the current frame of video data.

Aspect 26: The method of Aspect 25, wherein: a location of the three first sets of collocated motion vector data within the respective three reference frames is the same; and the location of the three first sets of collocated motion vector data within the respective three reference frames is the same as a location of the first block of video data within the current frame of video data.

Aspect 27: The method of any of Aspects 25 to 26, wherein: a location of the three second sets of collocated motion vector data within the respective three reference frames is the same; and the location of the three second sets of collocated motion vector data within the respective three references frames is the same as a location of the second block of video data within the current frame of video data.

Aspect 28: The method of any of Aspects 16 to 27, wherein: the first block of video data is a 128×128 block of video data; and the one or more first sets of collocated motion vector data have a same size as the first block of video data.

Aspect 29: The method of any of Aspects 16 to 28, wherein projecting each set of the one or more first sets of collocated motion vector data comprises: splitting each set of the one or more first sets of collocated motion vector data into a first 64×128 set of collocated motion vector data and a second 64×128 set of collocated motion vector data; and projecting the first 64×128 set and the second 64×128 set in inverse-N order.

Aspect 30: The method of Aspect 29, wherein the first 64×128 set and the second 64×128 set are non-overlapping.

Aspect 31: A non-transitory computer-readable storage medium having stored thereon instructions which, when executed by one or more processors, cause the one or more processors to perform any of the operations of Aspects 1 to 30.

Aspect 32: An apparatus comprising means for performing any of the operations of Aspects 1 to 30.

Aspect 33: A method of performing any of the operations of Aspects 1 to 15.

What is claimed is:

1. An apparatus for processing video data, comprising:
at least one memory; and
at least one processor coupled to the at least one memory, the at least one processor configured to:
obtain one or more first sets of collocated motion vector data associated with a first block of video data included in a current frame of video data;
project each set of the one or more first sets of collocated motion vector data into a first projected motion field associated with a first buffer;
obtain one or more second sets of collocated motion vector data associated with a second block of video data included in the current frame of video data;
project each set of the one or more second sets of collocated motion vector data into the first projected motion field associated with the first buffer; and
based on projecting each set of the one or more first sets of collocated motion vector data and projecting each set of the one or more second sets of collocated motion vector data into the first projected motion field associated with the first buffer, decode the first block of video data based on the first projected motion field associated with the first buffer.

2. The apparatus of claim 1, wherein the at least one processor is further configured to:
project each of the one or more first sets of collocated motion vector data into a second projected motion field associated with a second buffer, wherein the second projected motion field is associated with decoding the second block of video data.

3. The apparatus of claim 2, wherein the second block of video data is adjacent to the first block of video data.

4. The apparatus of claim 2, wherein the at least one processor is further configured to:
project each of the one or more second sets of collocated motion vector data into the second projected motion field associated with the second buffer; and
project each of the one or more second sets of collocated motion vector data into a third projected motion field associated with a third buffer, wherein the third projected motion field is associated with decoding a third block of video data located adjacent to the second block of video data.

5. The apparatus of claim 4, wherein the at least one processor is further configured to:
obtain one or more third sets of collocated motion vector data associated with the third block of video data included in the current frame of video data;
project each of the one or more third sets of collocated motion vector data into the second projected motion field associated with the second buffer; and
decode the second block of video data based on the second projected motion field associated with the second buffer.

6. The apparatus of claim 5, wherein the at least one processor is further configured to:
project each of the one or more third sets of collocated motion vector data into the third projected motion field associated with the third buffer;
delete the first projected motion field from the first buffer based on successfully decoding the first block of video data; and
project each of the one or more third sets of collocated motion vector data into a fourth projected motion field, wherein the fourth projected motion field is written to the first buffer.

7. The apparatus of claim 6, wherein the first buffer, the second buffer, and the third buffer are included in a sliding buffer.

8. The apparatus of claim 6, wherein the first buffer, the second buffer, and the third buffer are included in a circular buffer or a ping pong memory.

9. The apparatus of claim 5, wherein the at least one processor is further configured to:
delete the second projected motion field from the second buffer based on successfully decoding the second block of video data.

10. The apparatus of claim 1, wherein:
the one or more first sets of collocated motion vector data comprise three first sets of collocated motion vector data obtained from three respective reference frames associated with the current frame of video data; and
the one or more second sets of collocated motion vector data comprise three second sets of collocated motion vector data obtained from the three respective reference frames associated with the current frame of video data.

11. The apparatus of claim 10, wherein:
a location of the three first sets of collocated motion vector data within the respective three reference frames is the same; and
the location of the three first sets of collocated motion vector data within the respective three reference frames is the same as a location of the first block of video data within the current frame of video data.

12. The apparatus of claim 10, wherein:
a location of the three second sets of collocated motion vector data within the respective three reference frames is the same; and
the location of the three second sets of collocated motion vector data within the respective three references frames is the same as a location of the second block of video data within the current frame of video data.

13. The apparatus of claim 1, wherein:
the first block of video data is a 128×128 block of video data; and
the one or more first sets of collocated motion vector data have a same size as the first block of video data.

14. The apparatus of claim 13, wherein to project each set of the one or more first sets of collocated motion vector data, the at least one processor is configured to:
split each set of the one or more first sets of collocated motion vector data into a first 64×128 set of collocated motion vector data and a second 64×128 set of collocated motion vector data; and
project the first 64×128 set and the second 64×128 set in inverse-N order.

15. The apparatus of claim 14, wherein the first 64×128 set and the second 64×128 set are non-overlapping.

16. A method for processing video data, comprising:
obtaining one or more first sets of collocated motion vector data associated with a first block of video data included in a current frame of video data;
projecting each set of the one or more first sets of collocated motion vector data into a first projected motion field associated with a first buffer;
obtaining one or more second sets of collocated motion vector data associated with a second block of video data included in the current frame of video data;
projecting each set of the one or more second sets of collocated motion vector data into the first projected motion field associated with the first buffer; and
based on projecting each set of the one or more first sets of collocated motion vector data and projecting each set of the one or more second sets of collocated motion vector data into the first projected motion field associated with the first buffer, decoding the first block of video data based on the first projected motion field associated with the first buffer.

17. The method of claim 16, further comprising:
projecting each of the one or more first sets of collocated motion vector data into a second projected motion field associated with a second buffer, wherein the second projected motion field is associated with decoding the second block of video data.

18. The method of claim 17, wherein the second block of video data is adjacent to the first block of video data.

19. The method of claim 17, further comprising:
projecting each of the one or more second sets of collocated motion vector data into the second projected motion field associated with the second buffer; and
projecting each of the one or more second sets of collocated motion vector data into a third projected motion field associated with a third buffer, wherein the third projected motion field is associated with decoding a third block of video data located adjacent to the second block of video data.

20. The method of claim 19, further comprising:
obtaining one or more third sets of collocated motion vector data associated with the third block of video data included in the current frame of video data;
projecting each of the one or more third sets of collocated motion vector data into the second projected motion field associated with the second buffer; and
decoding the second block of video data based on the second projected motion field associated with the second buffer.

21. The method of claim 20, further comprising:
projecting each of the one or more third sets of collocated motion vector data into the third projected motion field associated with the third buffer;
deleting the first projected motion field from the first buffer based on successfully decoding the first block of video data; and
projecting each of the one or more third sets of collocated motion vector data into a fourth projected motion field, wherein the fourth projected motion field is written to the first buffer.

22. The method of claim 21, wherein the first buffer, the second buffer, and the third buffer are included in a sliding buffer.

23. The method of claim 21, wherein the first buffer, the second buffer, and the third buffer are included in a circular buffer or a ping pong memory.

24. The method of claim 20, further comprising:
deleting the second projected motion field from the second buffer based on successfully decoding the second block of video data.

25. The method of claim 16, wherein:
the one or more first sets of collocated motion vector data comprise three first sets of collocated motion vector data obtained from three respective reference frames associated with the current frame of video data; and
the one or more second sets of collocated motion vector data comprise three second sets of collocated motion vector data obtained from the three respective reference frames associated with the current frame of video data.

26. The method of claim 25, wherein:
a location of the three first sets of collocated motion vector data within the respective three reference frames is the same; and
the location of the three first sets of collocated motion vector data within the respective three reference frames is the same as a location of the first block of video data within the current frame of video data.

27. The method of claim 25, wherein:
a location of the three second sets of collocated motion vector data within the respective three reference frames is the same; and
the location of the three second sets of collocated motion vector data within the respective three references frames is the same as a location of the second block of video data within the current frame of video data.

28. The method of claim 16, wherein:
the first block of video data is a 128×128 block of video data; and
the one or more first sets of collocated motion vector data have a same size as the first block of video data.

29. The method of claim 16, wherein projecting each set of the one or more first sets of collocated motion vector data comprises:
splitting each set of the one or more first sets of collocated motion vector data into a first 64×128 set of collocated motion vector data and a second 64×128 set of collocated motion vector data; and
projecting the first 64×128 set and the second 64×128 set in inverse-N order.

30. The method of claim 29, wherein the first 64×128 set and the second 64×128 set are non-overlapping.

* * * * *